US006480605B1

(12) United States Patent
Uchiyama et al.

(10) Patent No.: US 6,480,605 B1
(45) Date of Patent: Nov. 12, 2002

(54) ENCRYPTION AND DECRYPTION DEVICES FOR PUBLIC-KEY CRYPTOSYSTEMS AND RECORDING MEDIUM WITH THEIR PROCESSING PROGRAMS RECORDED THEREON

(75) Inventors: Shigenori Uchiyama, Tokyo (JP); Tatsuaki Okamoto, Tokyo (JP)

(73) Assignee: Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/213,927

(22) Filed: Dec. 17, 1998

(30) Foreign Application Priority Data

Dec. 17, 1997 (JP) .............................. 9-347613
Feb. 13, 1998 (JP) ............................. 10-031561

(51) Int. Cl.$^7$ ................................................ H04L 9/30
(52) U.S. Cl. ...................... 380/30; 380/259; 380/285; 713/180
(58) Field of Search ............................. 380/28, 30, 29, 380/259–260, 283–385; 713/160, 169, 170, 176, 190

(56) References Cited

U.S. PATENT DOCUMENTS

| 4,405,829 | A | * | 9/1983 | Rivest et al. | 380/30 |
| 4,870,681 | A | * | 9/1989 | Sedlak | 380/30 |
| 4,944,007 | A | * | 7/1990 | Austin | 380/30 |
| 5,150,411 | A | * | 9/1992 | Maurer | 380/30 |
| 5,956,407 | A | * | 9/1999 | Salvin | 380/30 |
| 5,991,415 | A | * | 11/1999 | Shamir | 380/30 |

FOREIGN PATENT DOCUMENTS

| FR | 2759806 A1 | * | 2/1997 | ............. H04L/9/28 |
| FR | 2759806 | | 8/1998 | |

OTHER PUBLICATIONS

Vanstone, S.A., et al., "Elliptic Curve Cryptosystems using Curves of Smooth Order over the Ring Zn," *IEEE Transactions on Information Theory*, Jul. 1997, vol. 43, No. 4, pp. 1231–1237.

K. Koyama, "Security of Okamoto Public–Key Cryptosystem," *Electronics Letters*, vol. 22, No. 20, Sep. 25, 1986, pp. 1033–1034.

Taher ElGamal/a public key cryptosystem and a signature scheme based on discrete logarithms/1985/IEEE.*

Alfered J. Menezes/handbook of applied cryptography/1997/library of congress/294–298.*

* cited by examiner

*Primary Examiner*—Gilberto Barron
*Assistant Examiner*—Kambiz Zand
(74) *Attorney, Agent, or Firm*—Connolly Bove Lodge & Hutz LLP

(57) ABSTRACT

In a public-key cryptosystem based on a multiplicative group, $n=p^2q$, where p and q are odd primes, and g, selected from $(Z/nZ)^*$ such that $g_p = g^{r-1} \mod p^2$ has an order of p in $(Z/p^2Z)^*$, are made public. A plaintext m, a random number and n are used to calculate m+rn, and n and g are used to compute $C = g^{m+rn} \mod n$ to generate it as ciphertext. For the ciphertext C, C mod $p^2$ is calculated, then $C_p = C^{p-1} \mod p^2$ is calculated to obtain $(C_{p-1})/p = L(C_p)$, and $L(C_p)$ is multiplied by a secret key $L(g_p)^{-1} \mod p$ to obtain the plaintext m.

31 Claims, 8 Drawing Sheets

COMPARISON BETWEEN TYPICAL COMMON-KEY
CRYPTOSYSTEMS AND THIS INVENTION SYSTEM

|  | ENCRYPTION | DECRYPTION | ONE-WAY PROPERTY | INTRACTABILITY |
|---|---|---|---|---|
| THIS INVENTION SYSTEM | 230 | 140 | ◎ | ○ |
| RSA | 17 | 400 | ? | × |
| Rabin | 1 | 400 | ◎ | × |
| ElGamal | 3000 | 1500 | ? | ○ |

ENCRYPTION AND DECRYPTION DEVICES FOR PUBLIC-KEY CRYPTOSYSTEMS AND RECORDING MEDIUM WITH THEIR PROCESSING PROGRAMS RECORDED THEREON

BACKGROUND OF THE INVENTION

The present invention relates to encryption and decryption devices for use in public-key cryptosystems and a recording medium with their processing programs recorded thereon.

In the transmission and reception of data over a security-free communication channel, cryptosystems are used to guard against wiretapping. In general, cryptosystems fall into two categories: common-key cryptosystem and public-key cryptosystem. In the common-key cryptosystem, encipher and decipher keys are the same, and hence they need to be delivered in secrecy. Furthermore, since this technique requires as many keys as combinations of communication, an increase in the number of sending/receiving stations in the network inevitably causes an increase in the number of keys that must be kept secret.

On the other hand, the public-key cryptosystem uses different keys as encipher and decipher keys. Even if the encipher key is made public, the secrecy of the decipher key could be maintained as long as its computation from the encipher key is infeasible in terms of computational complexity. Accordingly, no delivery of the encipher key is necessary. Moreover, since each sending/receiving station needs only to keep its own decipher key in secrecy, it is also possible to solve the problem of the keys to be held secret. That is, the public-key cryptosystem offers a solution to the problem of key management encountered in the common-key cryptosystem. Another advantage of the public-key cryptosystem over the common-key cryptosystem is the settlement of the problem of key delivery which is the greatest difficulty with the latter; the former does not involve the secret key delivery. Besides, in public-key cryptosystem the same key is shared by the persons concerned, it is impossible to identify which person generated a ciphertext using the common key. With the public-key cryptosystem, however, since each person has his own secret key exclusively, it is possible to identify the person who generated a ciphertext using the secret key. Digital signature schemes utilize this property of public-key cryptosystem.

That is, the use of public-key cryptosystem permits the implementation of digital signature schemes, and ensures verification of the opponent of communication. It is well-known in the art that the public-key cryptosystem can be implemented through utilization of what is called a trapdoor one-way function. A one-way function is one that allows ease in computation in one direction but makes computation in the opposite direction infeasible in terms of computational complexity. The trapdoor one-way function mentioned herein is a one-way function with a trick "knowledge of some secret allows ease in computation in the opposite direction as well." The trick is called a "trapdoor."

At present, there are known such yet-to-be-solved problems as listed below.
   (a) Integer Factorization Problem (hereinafter referred to as IFP): A problem of factoring an input composite number into its prime factors;
   (b) Discrete Logarithm Problem of Multiplicative Group over Finite Field (hereinafter referred to as DLP): A problem of determining, for example, an integer x in $y=g^x$ satisfying $0 \leq x \leq p$ for a given element y in a multiplicative group $F_p^* = <g>$ of a finite field $F_p$, where p is a prime;
   (c) Discrete Logarithm Problem of elliptic curves over Finite Field (hereinafter referred to as ECDLP): A problem of determining, for example, an integer m satisfying P=mG for a point P in a subgroup of $E(F_p)$ generated from a point G in a group $E(F_p)$ composed of the entire $F_p$-points on an elliptic curve defined over the finite field $F_p$.

For the elliptic curve and elliptic curve cryptosystems, see, for example, Menezes, A. J., "Elliptic Curve Public Key Cryptosystems," Kluwer Academic Publishers (1993) (hereinafter referred to as Literature 1). The cryptosystems described in this literature are typical examples expected to use the one-way function. Typical and practical ones of public-key cryptosystems proposed at present are, for instance, the RSA cryptosystem, the Rabin cryptosystem, the ElGamal cryptosystem, and the elliptic curve cryptosystem (elliptic ElGamal cryptosystem). The RSA and Rabin cryptosystems are based on the intractability of IFP, the ElGamal cryptosystem is based on the intractability of DLP, and the elliptic curve cryptosystem is an Elgamal cryptosystem in a group of points on an elliptic curve over a finite field, which is based on the intractability of ECDLP.

The RSA cryptosystem is disclosed in Rivest, R. L. et al "A Method for Obtaining digital Signatures and Public-Key Cryptosystems," Communication of the ACM, vol. 21, pp. 120–126 (1978) (hereinafter referred to as Literature 2). The Rabin cryptosystem is disclosed in Rabin, M. O. "Digital signatures and Public-Key Functions as in tractable as Factorization," MIT, Technical Report, MIT/LSC/TR-212 (1979) (hereinafter referred to as Literature 3). The ElGamal cryptosystem is disclosed in ElGamal, T. "A Public-Key Cryptosystem and a Signature Scheme Based on Discrete Logarithms," IEEE Trans. on Information Theory, IT-31, 4, pp. 469–472 (1985) (hereinafter referred to as Literature 4). The elliptic curve cryptosystem was proposed by Miller, V. S. and Kolblitz, N. separately in 1985, and this scheme is described in Miller, V. S. "Use of Elliptic Curves in Cryptography," Proc. of Crypto '85, LCNCS 218, springer-Verlag, pp. 417–426 (1985) (hereinafter referred to as Literature 5) and in Kolblitz, N., "Elliptic Curve Cryptosystems," Math. Comp., 48, 177, pp. 203–209 (1987) (hereinafter referred to as Literature 6).

Now, the above-mentioned cryptosystems and their properties will be described concretely.

A description will be given first of how the RSA cryptosystem is constructed. Let p and q be odd primes and choose n, e and d such that they satisfy the following equations:

$$n=pq$$

$$GCD(e, LCM(p-1, q-1))=1$$

$$ed \equiv 1 \pmod{LCM(p-1, q-1)}$$

where GCD(a, b) is the greatest common divisor of integers a and b, and LCM(a, b) is the least common multiple of the integers a and b.

The encryption and decryption processes E(M) and D(C) of a message M are defined by the following equations using (n, e) as public keys and (d, p, q) as secret keys.

$$C=E(M)=M^e \pmod{n} \qquad (1)$$

$$M=D(C)=C^d \pmod{n} \qquad (2)$$

At this time, if M satisfies $0 \leq M \leq n-1$, then the following equation holds.

$$D(E(M))=M \qquad (3)$$

The Rabin cryptosystem is constructed as follows: Choose p, q and n in the same manner as in the above, and determine the integer b which satisfies 0bn. The encryption process E(M) and the description process D(c) are defined by the following equations using (n, b) as public keys and (p, q) as secret keys.

$$C \equiv E(M) \equiv M(M + b) \pmod{n} \quad (4)$$

$$M \equiv D(C) \equiv \left(-b \pm (b^2 + 4C)^{1/2}\right)/2 \pmod{p} \quad (5)$$
$$\equiv \left(-b \pm (b^2 + 4C)^{1/2}\right)/2 \pmod{q}$$

The Rabin cryptosystem involves solving simultaneous equations in decryption, but since the quadratic equation possesses two solutions, the calculation in this case brings about four solutions, giving rise to a problem that the decryption cannot uniquely be performed under the above conditions. This can be settled as a problem of system operation by using some additional information for communication; and the Rabin cryptosystem has also been improved for unique description. This is described in Kaoru Krosawa et al., "Public-Key Cryptosystems Using Reciprocals which are as Intractable as Factoring," Journal of IEICE, Vol. J70-A, No. 11, pp. 1632–1636 (1987) (hereinafter referred as to Literature 7).

The ElGamal cryptosystem is constructed as follows: Let p be a prime. Choose g as one generating element of a modular-p reduced residue class group $(Z/pZ)^*$, that is, as an element of the order p. Choose an integer x such that $0<x<p$, and set $y \equiv g^x \pmod{p}$. The encryption process E(M) and the decryption process D(C) are defined by the following equations using (y, g, p) as public keys and x as a secret key.

$$C=(C_1, C_2)=E(M) \quad (6)$$

$$C_1 \equiv g^r \pmod{p} \quad (7)$$

$$C_2 \equiv y^r M \pmod{p} \quad (8)$$

$$M=D(C)C_2/C_1^x \bmod p \quad (9)$$

where r is an arbitrary integer such that $0<r<p$, which is chosen for each encryption.

If M is $0<M<p$, then the following equation holds.

$$M=D(E(M)) \quad (10)$$

The elliptic curve cryptosystem (elliptic ElGamal cryptosystem) is constructed as follows: Let p be a prime and define the elliptic curve over a finite field Fp as follows:

$$E(a, b): y^2=x^3+ax+b$$

where $a, b \in F_p$, and $4a^3+27b^2 \neq 0$

Choose an $F_p$-rational point G on the elliptic curve such that its order q has a sufficiently large prime as the divisor. Choose an arbitrary integer x such that $0<x<q$, and let $P=xG$ by addition on the elliptic curve E(a, b). Then, the encryption process E(M) and the decryption process D(C) are defined by the following equations using {p, E(a, b), G, P, q} as public keys and x as a secret key.

$$C=(C_1, C_2)=E(M) \quad (11)$$

$$C_1=rG_1 \quad (12)$$

$$C_2=rP+M \quad (13)$$

$$M=D(C)=(C_2-xC_1); \text{x-cordinate} \quad (14)$$

where r is an arbitrary integer which satisfies $0<r<q$, and is chosen for each encryption and rP+M is the sum, on the elliptic curve, of a point which has M on the X-coordinate and a point rp on the elliptic curve. In general, it is not known whether there is always present on a given elliptic curve the point which has M on the X-coordinate (In this case, the point exists with a probability of 1/2). If a rule common to systems is established to add redundant information to M to some extent, it will be possible to always obtain the point which has, on the X-coordinate, M added with redundant information.

Next, a description will be given of the computational complexity of each cryptosystem mentioned above. As regards the RSA cryptosystem, it is well-known that the computational complexities for both of the encryption and the decryption are on the order of $k^3$, where k is the number of bits of the public key n. In the Rabin cryptosystem, the computational complexity is on the order $k^2$ for encryption and on the order of $k^3$ for decryption. In this case, too, k represents the number of bits of the public key n.

In the ElGamal cryptosystem, the computational complexity is on the order of $k^3$ for each of the encryption and the decryption, where k represents the number of bits of the prime p used as the public key.

The computational complexities of the above cryptosystems do not so much differ in terms of order, but it is evident that when they are implemented, their computational complexities will much differ. Actually it is well-known that the addition on the elliptic curve takes time about ten times longer than does multiplication in the finite field over which the elliptic curve is defined.

Next, the security of the above cryptosystems will be described.

Since the cryptosystems are intended to send messages in the form of ciphertexts to conceal the message contents from adversaries (wiretappers), it is of importance the extent to which the message contents are concealed. That is, the intractability of cryptoanalysis falls into full or complete analysis or decryption (means that the original plaintext is fully decrypted from the ciphertext) and fractional analysis (which means that fractional information of the plaintext is decrypted from the ciphertext). Attacks on the public-key cryptosystems are divided into two types: (a) passive attacks which merely receive an encrypted message and try to decrypt or analyze its contents only from the received information, and (b) active attacks which are allowed to send various challenges or questions (in ciphertext form) to the sending party and receive responses thereto (the results of decryption of the ciphertext) and analyze or decrypt the aimed ciphertext based on the information received from the sending party. Of the active attacks, an adaptive chosen ciphertext attack (an attack that the cryptoanalyst causes his arbitrarily chosen ciphertext to be decrypted by the true receiving part and then decrypts another ciphertext through utilization of the thus obtained information and public information is the most powerful.

Now, the security of the typical public-key cryptosystems will be described based on the classifications referred to above. In the cryptosystems based on the intractability of the IF (Integer Factoring) problem, such as the RSA and Rabin cryptosystems, if the public key n can be factored, then the primes p and q which constitute the secret key can be detected and the least common multiple LCM(p−1, q−1) can be computed, by which the secret key d is obtained. Hence, these cryptosystems are subject to full or complete analysis. It has been proven that the computation of LCM(p−1, q−1) solely from n is equivalent to the factoring of the latter. That is, LCM(p−1, q−1) cannot be obtained unless the primes p and q are known.

The RSA cryptosystem may be completely be analyzed by a method other than that of factoring the public key n into a prime factor, but it has been proven that only the factoring of the public key n is effective in complete analysis of the Rabin cryptosystem. That is, although it is still unknown whether the analysis of the RSA cryptosystem is equivalent to solving the IF problem, it has been proved that complete analysis of the Rabin cryptosystem is equivalent to solving the IF problem. The same is true of an inverse version of the Rabin cryptosystem. This finding on the Rabin cryptosystem has demonstrated for the first time that a certain kind of security of the cryptosystem can be proved by the assumption of the intractability of a basic problem (the IF problem in this case). This means that the security of above-described public-key cryptosystems against the passive attacks has been proved on the assumption of the intractability of the IF problem. Conversely, this is a proof that the Rabin cryptosystem is weak against the active attacks. An efficient cryptosystem, which is secure against the chosen ciphertext attack, is disclosed, for example, in Bellare et al., "Optimal Asymmetric Encryption," Proc. of Eurocrypt 194, LCNCS 950, Springer-Verlag, pp. 92–111, 1995 (hereinafter referred to as Literature 8).

As regards fractional or partial cryptoanalysis, it has been proved on the RSA and Rabin cryptosystem that the computation of the least significant bit of the plaintext M from the ciphertext is as difficult as the computation of the whole plaintext M from the ciphertext C. It has also been proved that the portion of the plaintext corresponding to log k bits continuing from its least significant bit possesses similar security. This is described in Alexi, W. et al., "RSA and Rabin functions: certain parts Are as Hard as the Whole," SIAM Journal of computing, 17, 2, pp. 449–457 (1988) (hereinafter referred to as Literature 9).

The ElGamal cryptosystem is based on the intractability of DLP (the discrete logarithm problem); hence, if DLP can be solved, then the secret key x is available from the public key (y, g, p), permitting the analysis of the cryptosystem. However, it has not been proved whether the analysis of the ElGamal cryptosystem is as hard as DLP. As for the elliptic cryptosystem, too, it has not been proved whether its analysis is as hard as ECDLP (the problem of the discrete logarithm on the elliptic curve).

As described above, the public-key cryptosystems solves the key management problem raised in the conventional common-key cryptosystem, and permit implementation of digital signature schemes. However, the public-key cryptosystems, for which a certain kind of security can be proved by assuming the intractability of the basic problem are limited only to the Rain cryptosystem and its modifications. That is, actually usable one-way functions are only IFP, DLP and ECDLP. No provably secure public-key cryptosystem has been implemented which uses a new "trapdoor" based on such a known one-way function.

SUMMARY OF THE INVENTION

It is therefore an object of the present invention to provide encryption and decryption devices for public-key cryptosystems which use IFP as a one-way function but uses a new "trapdoor" and which can be proved to be secure against passive adversaries based on the assumption that IFP is intractable.

Another object of the present invention is to provide a recording medium on which there are recorded encryption and decryption programs of the encryption and decryption devices for public-key cryptosystems.

The encryption device according to the present invention comprises: exponent generation means for combining an input plaintext m and a random number r to generate an exponent; and exponentiating means for generating a ciphertext by exponentiating a second public key g with the exponent in a modular-n reduced residue class group, where n is a first public key which is a composite number.

The decryption device according to the present invention comprises: Γ-transform means for transforming an input ciphertext, by using a first secret key, to an element $C_p$ of a modular-n reduced residue class group, where n is the first public key which is a composite number; and discrete logarithm solution means for solving a discrete logarithm in the transformed element $C_p$ through the use of a second secret key.

DETAILED DESCRIPTION OF THE PREFERRED EMBODIMENTS

Figure 1:
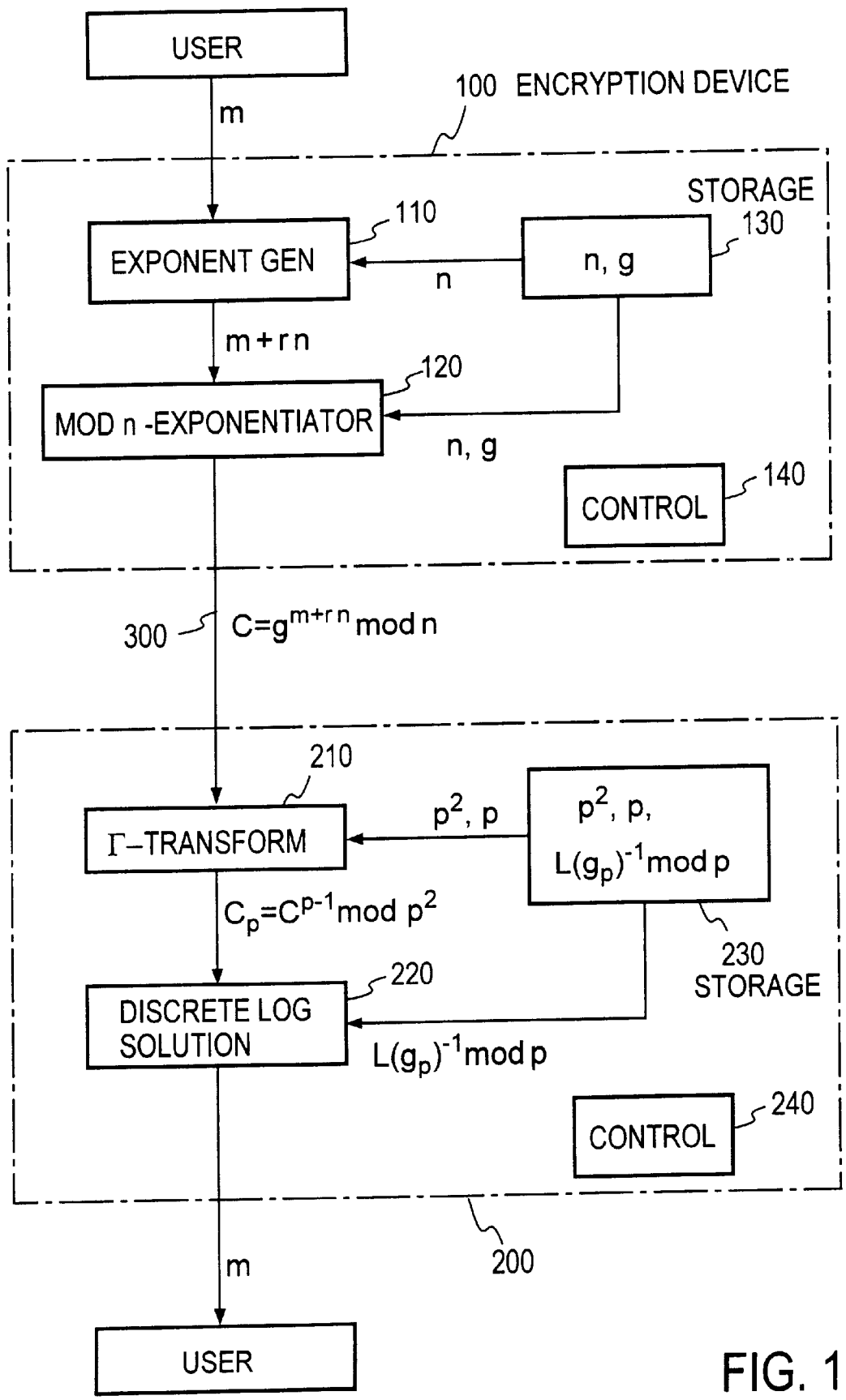
FIG. 1 is a block diagram illustrating the functional configuration of an embodiment of each of encryption and decryption devices in a "public-key cryptosystem based on a multiplicative group" according to the present invention.

It is known that the discrete logarithm problem in a p-Sylow subgroup of a certain group can be solved with high efficiency. The p-Sylow subgroup herein mentioned is that one of subsets of, for example, a finite group H whose order is the highest power of p among the subgroups. The present invention provides a novel public-key cryptosystem for which a certain level of security can be proved, through utilization of highly efficient solvability of the discrete logarithm problem in the p-Sylow subgroup of a specific finite group.

More specifically, the present invention offers two kinds of public-key cryptosystem: (a) a public-key cryptosystem which is constructed on a modular-n reduced residue class group $(Z/nZ)^*$, where $n=p^2q$, p and q being primes; and (b) a public-key cryptosystem which is constructed on an elliptic curve $E_n$ defined on a modular-n reduced residue class group Z/nZ, where n=pq. The former will hereinafter be called a "public-key cryptosystem based on a multiplicative group" and the latter a "public-key cryptosystem based on an elliptic curve."

Public-Key Cryptosystem Based on Multiplicative Group

<Principle>

In a modular-$p^2$ reduced residue class group $(Z/nZ)^*$ mod $p^2$, where p is an odd prime, its p-Sylow subgroup $\Gamma$, which is a subgroup with order p, can be written as follows:

$$\Gamma=\{x \in (Z/p^2Z)^* | x \equiv 1 (\mathrm{mod}\ p)\} \quad (15)$$

The discrete logarithm problem over $(Z/p^2Z)^*$ is commonly believed to be still a very difficult problem, and no efficient alorithm for solving it has been discovered. However, the discrete logarithm problem in the p-Sylow subgroup $\Gamma$ (hereinafter referred to merely as a subgroup $\Gamma$) can be solved with high efficiency. Now, consider the following function defined over the subgroup $\Gamma$.

$$L(x)=(x-1)/p, \quad x \in \Gamma \quad (16)$$

This function is an $F_p$-valued function. For arbitrary values a and b, this function L holds as follows:

$$L(ab)=L(a)+L(b) \bmod p \quad (17)$$

It will also be seen that this function L provides an isomorphism as a group of the subgroup $\Gamma$ to the finite field $F_p$. It will readily be understood that the computational quantity of the subgroup $\Gamma$ is on the order $k^2$ where k is the number of bits of p. Accordingly, the discrete logarithm problem in the subgroup $\Gamma$, that is, a problem of calculating m from x and y, where $x \in \Gamma$, $0<m<p$ and $y=x^m$, can be efficiently solved for the reason given below. From Eq. (17)

$$L(y)=L(x^m)=mL(x) \bmod p \quad (18)$$

So, if $L(x) \neq 0$ mod p, then the value m is given by $$m=L(y)/L(x) \bmod p \quad (19)$$

The computational complexity for computing m from x and y is on the order of $k^3$, where k is the number of bits of p.

Through utilization of this property, it is possible to construct a novel "trapdoor" and hence a novel public-key cryptosystem.

FIRST EMBODIMENT

The public-key cryptosystem based on the multiplicative group according to the present invention will be described below as being applied to a public-key cryptosystem which is constructed on a modular-n reduced residue class group $(Z/nZ)^*$, where $n=p^2q$, p and q being primes. From the Chinese remainder theorem (for example, Okamoto and Yamamoto, "Modem Cryptography," pp.15, Sangyo Tosho (1997) (hereinafter referred to as Literature 12), the following equations hold:

$$(Z/nZ)^* \cong (Z/p^2Z)^* \times (Z/qZ)^* \quad (20)$$

$$\cong \Gamma \times (Z/pZ)^* \times (Z/qZ)^* \quad (21)$$

Therefore, the "public-key cryptosystem based on the multiplicative group" is defined as described below. Determine g in $g \in (Z/nZ)^*$ such that $g_p=g^{p-1}$ mod $p^2 \in \Gamma$ satisfies $L(g_p) \neq 0$ mod p, and let n, g, k be public keys, where k is the numbers of bits of primes p and q. Assuming that the plaintext m is a natural number chosen in the range of $0 \leq m \leq 2^{k-1}$, r is arbitrarily selected from Z/nZ and the encryption is defined by $$C=g^{m+rn} \bmod n \quad (22)$$

In the case of decryption, if C can be transformed to the element of $\Gamma$, then a person who knows the prime factor p of n can efficiently compute the discrete logarithm by using the function L defined by Eq. (16). Since m is in the range of $0 \leq m < 2^{k-1}$, it is uniquely determined under mod p; hence, the decryption can efficiently be performed. In the transformation of C to the element of $\Gamma$, if $$C_p=C^{p-1} \bmod p^2 \quad (23)$$

then $C_p \in \Gamma$. This means that $C_p$ given by Eq. (23) is contained in the subgroup with order p given by Eq. (15). And, it can be proved that the analysis of the public-key cryptosystem is equivalent to factoring of the public key n, that is, equivalent to IFP.

In the "public-key cryptosystem based on the multiplicative group" according to the present invention, the encryption device comprises an exponent generation part which combines a plaintext and a random number to generate an exponent part for a modular-n exponentiation, and an n-exponentiator for performing a modular-n exponentiation. A ciphertext generated by the n-exponentiator is provided onto a communication line, for instance. On the other hand, the decryption device comprises a $\Gamma$-transformation part for performing a p−1 exponentiation modulo $p^2$, and a discrete logarithm solution part for solving a discrete logarithm problem in a subgroup $\Gamma$ to decrypt the ciphertext.

Embodiments of Public-Key Cryptosystem Based on Multiplicative Group

A description will be given first of the basic functional configuration of the "public-key cryptosystem based on the multiplicative group" according to the present invention and then of embodiments of each part thereof.

<Key Generation>

Let odd primes p and q be chosen arbitrarily and $n=p^2q$ be set, where the odd primes p and q are assumed to have the same number k of bits.

Further, g is selected from $(Z/nZ)^*$ such that $g_p=g^{p-1}$ mod $p^2$ has the order p in $(Z/p^2Z)^*$, which constitutes the p-Sylow subgroup $\Gamma$. Then, $L(g_p) \neq 0$ mod p holds with the afore-mentioned function L. Actually, the value with order p in $(Z/p^2Z)^*$ can be expressed by 1+kp mod $p^2$ (where k is indivisible), and hence $L(1+kp)=[(1+kp)-1]/p=k \neq 0$ mod p. More specifically, when g is selected from $(Z/nZ)^*$ randomly, the probability of $L(g_p) \neq 0$ mod p is considered to be around 1−(1/p); therefore, g can be chosen with non-negligible probability. A user cannot publish $L(g_p)^{-1}$ mod p but precalculates it as one of system parameters.

Accordingly, (n, g, k) is used as public keys and (p, q) as secret keys. In this case, $L(g_p)^{-1}$ mod p may also be considered as a secret key.

<Encryption Process>

For the plaintext m (where $0 \leq m < 2^{k-1}$), a random number r is selected in the range of $0 \leq r < n$, then m+rn is calculated, and the ciphertext C is computed as follows:

$$C = g^{m+rn} \bmod n \qquad (24)$$

<Decryption Process>

By raising either side of the ciphertext C defining equation (24) to the (p−1)th power, a congruence equation with mod n holds with mod $p^2$ as well. The order of $g_p$ mod $p^2$ is p and m is a multiple of p; so, $g_p^{rn} = 1$. Hence, $$C^{p-1} = g^{(p-1)(m+rn)} = g_p^m \times g_p^{rn} \bmod p^2 = g_p^m \bmod p^2 \qquad (25)$$

Therefore, setting $$C_p = C^{p-1} \bmod p^2 \qquad (26)$$

then $$C_p = g_p^m \bmod p^2 \qquad (27)$$

Since $C_p, g_p \in \Gamma$, the use of the function L defined by Eq. (16) gives $$L(C_p) = L(g_p^m) = mL(g_p) \bmod p \qquad (28)$$

that is, $$m = L(C_p)/L(g_p) \bmod p \qquad (29)$$

Thus, the ciphertext can be decrypted.

With the above decryption procedure, the ciphertext C is decrypted by first calculating $C_p$ with Eq. (26), then calculating $L(C_p) = (C_p - 1)/p$, and finally performing a modular-p multiplication of $L(C_p)$ and precalculatable $L(g_p)^{-1}$ mod p.

<Proof of Security>

Now, it will be proved that the "public-key cryptosystem based on the multiplicative group" is secure against passive adversaries or attacks, by proving that the analysis of the cryptosystem is equivalent to the factorization of n.

If an algorithm is available which factorizes n with non-negligible probability, it is possible to construct a probabilistic polynomial time algorithm for analyzing the "public-key cryptosystem based on the multiplicative group." Hence, only the following fact will be proved in this instance.

"If an algorithm A is available which analyzes the 'public-key cryptosystem' with non-negligible probability, then it is possible to construct a probabilistic polynomial time algorithm for factoring."

What is intended to mean by the "algorithm for facotring n with non-negligible probability" is an algorithm which ensures factoring of n by repeatedly applying the algorithm on the order of a polynomial using the number of bits of the input n as a variable. The same holds true in the following description (see Literature 12 for its strict definition).

Now, given a composite number n $(=p^2q)$, $g \in (Z/nZ)^*$ randomly selected can be used as a parameter of the public-key cryptosystem of the present invention with non-negligible probability. Next, it is possible to prove that the difference between the distribution of x mod p LCM(p−1, q−1), where x is randomly selected from Z/nZ, and the distribution of m+rn mod p LCM(p−1, q−1) for m+rn, which appears in the encryption procedure of the public-key cryptosystem according to the present invention is negligible. For this reason, the algorithm A recognizes that C calculated by $C = g^x \bmod n$, where x is randomly selected from Z/nZ, is a ciphertext with non-negligible probability, and the algorithm A outputs a plaintext $x_0$ corresponding to C. Now, since the probability that x is a number in the range of $x < 2^{k-1}$ is negligible, it may be set such that $x \geq 2^{k-1}$ with non-negligible probability. In this case, $x \equiv x_0 \pmod{p}$ does not hold, and $x \equiv x_0 \pmod{n}$ does not hold because of $x_0 < 2^{k-1}$. Accordingly, if $GCD(x-x_0, n)$ is calculated, it value becomes any one of p, pq and $p^2$, permitting factoring of n. Thus, it is possible to factor n in a time on the order of probabilistic polynomial using its bit number as a variable. In other words, the analysis of the public-key cryptosystem of the present invention is equivalent to factoring of n—this proves that the cryptosystem is secure against passive adversaries.

<Concrete Example>

Next, a description will be given of a concrete example of the "public-key cryptosystem based on the multiplicative group" according to the present invention. As illustrated in FIG. 1, an encryption device 100 and a decryption device 200 are connected via a communication line 300. The encryption device 100 comprises an exponent generation part 110, a modular-n exponentiator 120, a storage part 130 for storing predetermined values n and g, and a control part 140 for controlling operations of these parts. The decryption device 200 comprises a Γ-transform part 210, a discrete logarithm solution part 220, a storage part 230 and a control part 240 for controlling operations of these parts.

Figure 2A:
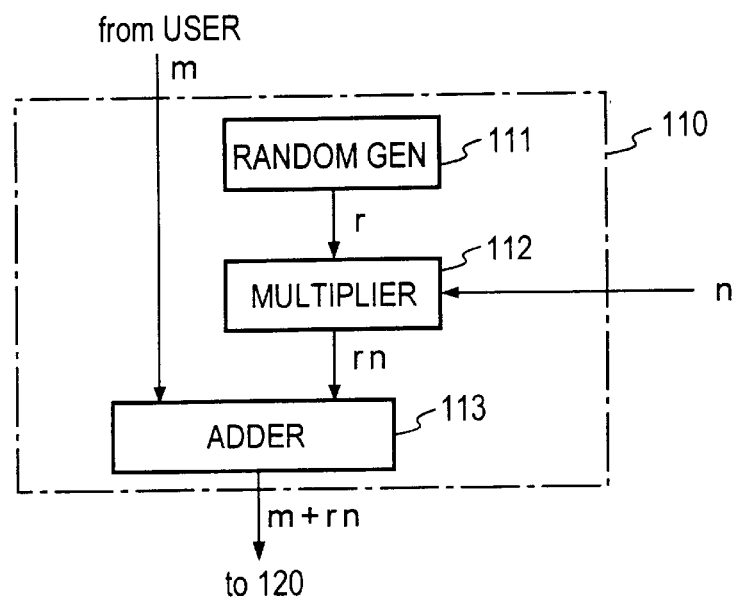
FIG. 2A is a block diagram depicting a concrete example of the functional configuration of an exponent generation part 110 in FIG. 1.

In the first place, the encryption process in the encryption device 100 will be described below. A detailed configuration of the exponent generation part 110 in the encryption device 100 is depicted in FIG. 2A. Upon receiving a plaintext (m) from a user of the encryption device 100, the exponent generation part 110 generates a random number $r \in Z/nZ$ by a random generator 111, and inputs the random number r into a multiplier 112. The multiplier 112 multiplies the random number r by the value n read out of the storage part 130, and provides the multiplied value rn to an adder 113. The adder 113 adds the plaintext m and the multiplied value rn, and provides the addition result m+rn to the modular-n exponentiator 120. The exponentiator 120 uses the values n and g read out of the storage part 130 to generate a ciphertext $C = g^{m+rn} \bmod n$ corresponding to the value m+rn.

Figure 2B:
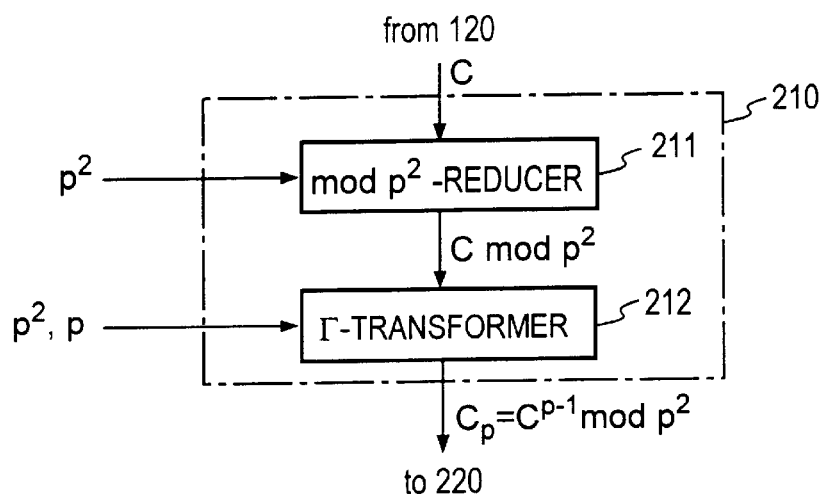
FIG. 2B is a block diagram depicting a concrete example of the functional configuration of a Γ-transform part 210 in FIG. 1.
Figure 2C:
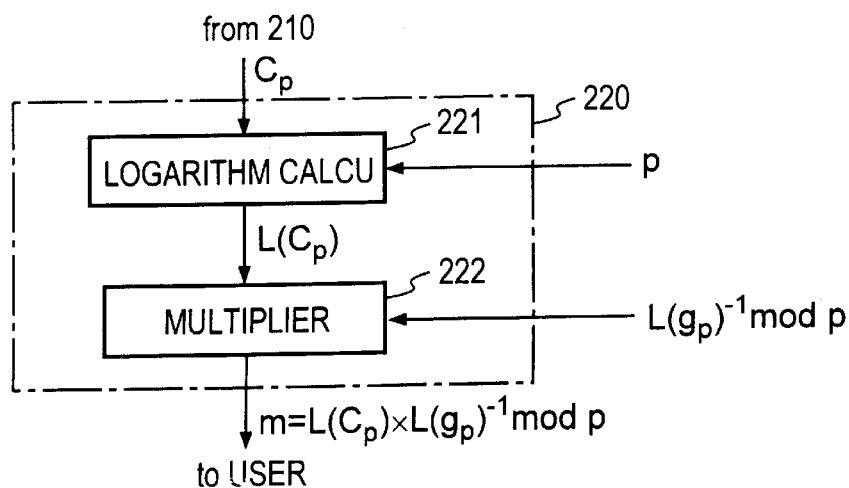
FIG. 2C is a block diagram depicting a concrete example of the discrete log solution part 220 in FIG. 1.

Next, the decryption process in the decryption device 200 will be described below. A detailed configuration of the Γ-transform part 210 in the decryption device 200 is depicted in FIG. 2A. A detailed configuration of the discrete logarithm solution part 220 is depicted in FIG. 2C. Upon receiving the ciphertext C from the communication line 300, the Γ-transform part 210 in the decryption device 200 calculates mod $p^2$ in a mod $p^2$-reducer 211 using a value $p^2$ read out of the storage part 230, and inputs the value mod $p^2$ into a Γ-transformer 212. The Γ-transformer 212 computes $C_p = C^{p-1} \bmod p^2$ using $p^2$ and p read out of the storage part 230, and provides the value $C_p$ to the discrete logarithm solution part 220. The discrete logarithm solution part 220 provides the value $C_p$ from the Γ-transform part 210 to a logarithm calculator 221, which calculates $L(C_p)$ by Eq. (16) using the value p read out of the storage part 230. The value $L(C_p)$ is input into a multiplier 222, which calculates $L(C_p) \times L(g_p)^{-1} \bmod p$ using $L(g_p)^{-1} \bmod p$ read out of the storage part 230. The discrete logarithm solution part 220 outputs the thus obtained value as a decrypted plaintext m.

The encryption procedure by the encryption device 100 may be implemented by recording the procedure as an operation program on a recording medium and reading it out for execution by a computer. Similarly, the decryption procedure by the decryption device 200 may be implemented by executing an operation program read out of a recording medium.

Modification of First Embodiment

In the above-described embodiment, as will be seen from its representation, the ciphertext is a directly encrypted version of the plaintext m in the raw, as expressed by $C=g^{m+rn}$ mod n, and it is not proved to be secure against passive adversaries. A description will be given of embodiments of an encryption device which are improved in this respect from the FIG. 1 embodiment and can be proved to be secure against passive adversaries.

In an embodiment (Modified Embodiment 1) of such modifications the number of bits of the plaintext m is set at $k_0$ (where $k_0<k$) and the value $k_0$ is made public. Furthermore, the number of bits of the random number r is set at $k-k_0-1$, then a bit-string concatenation of m and r is represented by mar, which is made $M=m\|r$. Then, M satisfies $0 \leq M < 2^{k-1}$. Moreover, a hash function is used to obtain $R=h(M)$, where $R \in (Z/nZ)$.

At this time, the encryption is defined as follows:

$$C = g^{M+Rn} \bmod n \tag{30}$$

The decryption is performed in exactly the same manner as described above, by which M is obtained, and in this instance, high-order $k_0$ bits can be obtained as the plaintext. As is the case with the above, the thus modified ciphertext can be proved to be secure against passive attacks, and by assuming that the hash function h is the random number, it can also be proved that the ciphertext is secure against chosen ciphertext attacks. For details about this, see Literature 8.

In another modification (Modified Embodiment 2), letting the plaintext and the number of its bits be represented by m and $k_0$ as in the above, $R=h(m)$ is set. In this case, let the number of bits of R be represented by $k-k-k_0-1$, and set $M=m\|R$. Furthermore, the random number $r \in Zn$, and the encryption process is defined as follows:

$$C = g^{M+rn} \bmod n \tag{31}$$

The decryption is performed in exactly the same manner as in the above, by which M is obtained, and in this case, high-order $k_0$ bits of M can be obtained as the plaintext. The security of this modified embodiment will be understood from the afore-mentioned proof of security and by reference to Literature 8.

Concrete Examples of Modified Embodiments

A description will be given first of procedures involved in the cryptosystems according to Modified Embodiments 1 and 2.

<Key Generation>

Modified Embodiments 1 and 2 are common in the method of key generation. Let the odd primes p and q be selected arbitrarily, and $n=p^2q$. The odd primes p and q have the same number of bits, which is represented by k. Assume that they satisfy $GCD(p-1, q-1)=1$. Furthermore, $k_0$ (where $k_0<k$) is also predetermined. Further, g is selected from $(Z/nZ)^*$ such that $g_p=g^{p-1}$ mod $p^2$ has the order p in $(Z/p^2Z)^*$. By this, $L(g_p)\neq 0$ mod p holds with the function L defined by Eq. (16). Actually, the value with order p in $(Z/p^2Z)^*$ can be expressed by $1+kp$ mod $p^2$ (where k is indivisible), and hence $L(1+kp)=[(1+kp)-1]/p=k \neq 0$ mod p. More specifically, when g is selected from $(Z/nZ)^*$ randomly, the probability of $L(g_p)\neq 0$ mod p is considered to be around $1-(1/p)$; therefore, g can be chosen with non-negligible probability. A user cannot publish $L(g_p)^{-1}$ mod p but precalculates it as one of system parameters. Let h be a hash function, (n, g, k, $k_0$, h) be public keys and (p, q) be secret keys. In this instance, $L(g_p)^{-1}$ mod p may also be regarded as a secret key.

<Encryption Process of Modified Embodiment 1>

For the plaintext m, the function h is used to obtain $M=m\|h(m)$, and the random number r is chosen in the range of $0 \leq r<n$. The ciphertext C is computed as follows:

$$C = g^{M+rn} \bmod n \tag{32}$$

<Encryption Process of Modified Embodiment 2>

For the plaintext m, the random number r (of $k-k_0-1$ bits) is generated to obtain $M=m\|r$, and the hash function h is used to obtain $R=h(M)$. The ciphertext C is computed as follows:

$$C = g^{M+Rn} \bmod n \tag{33}$$

<Decryption Process of Modified Embodiment 1>

By raising either side of the ciphertext C defining equation (32) to the (p−1)th order, the congruence expression with mod n holds with mod $p^2$ as well. The order of $g_p$ mod $p^2$ is p, and m is a multiple of p; so, $g_p^{rn}=1$. Hence, $$C^{p-1}=g^{(p-1)}(M+rn)=g_p^M \times g_p^{rn} \bmod p^2 = g_p^M \bmod p^2 \tag{34}$$

Therefore, setting $$C_p = C^{p-1} \bmod p^2 \tag{35}$$

then $$C_p = g_p^M \bmod p^2 \tag{36}$$

Since $C_p, g_p \in \Gamma$, the use of the function L defined by Eq. (16) gives $$L(C_p) = L(g_p^M) = ML(g_p) \bmod p \tag{37}$$

that is, $$M = L(C_p)/L(g_p) \bmod p \tag{38}$$

Thus, the plaintext m can be obtained from the high-order $k_0$ bits of M and thus decrypted.

<Decryption Process of Modified Embodiment 2>

Figure 3:
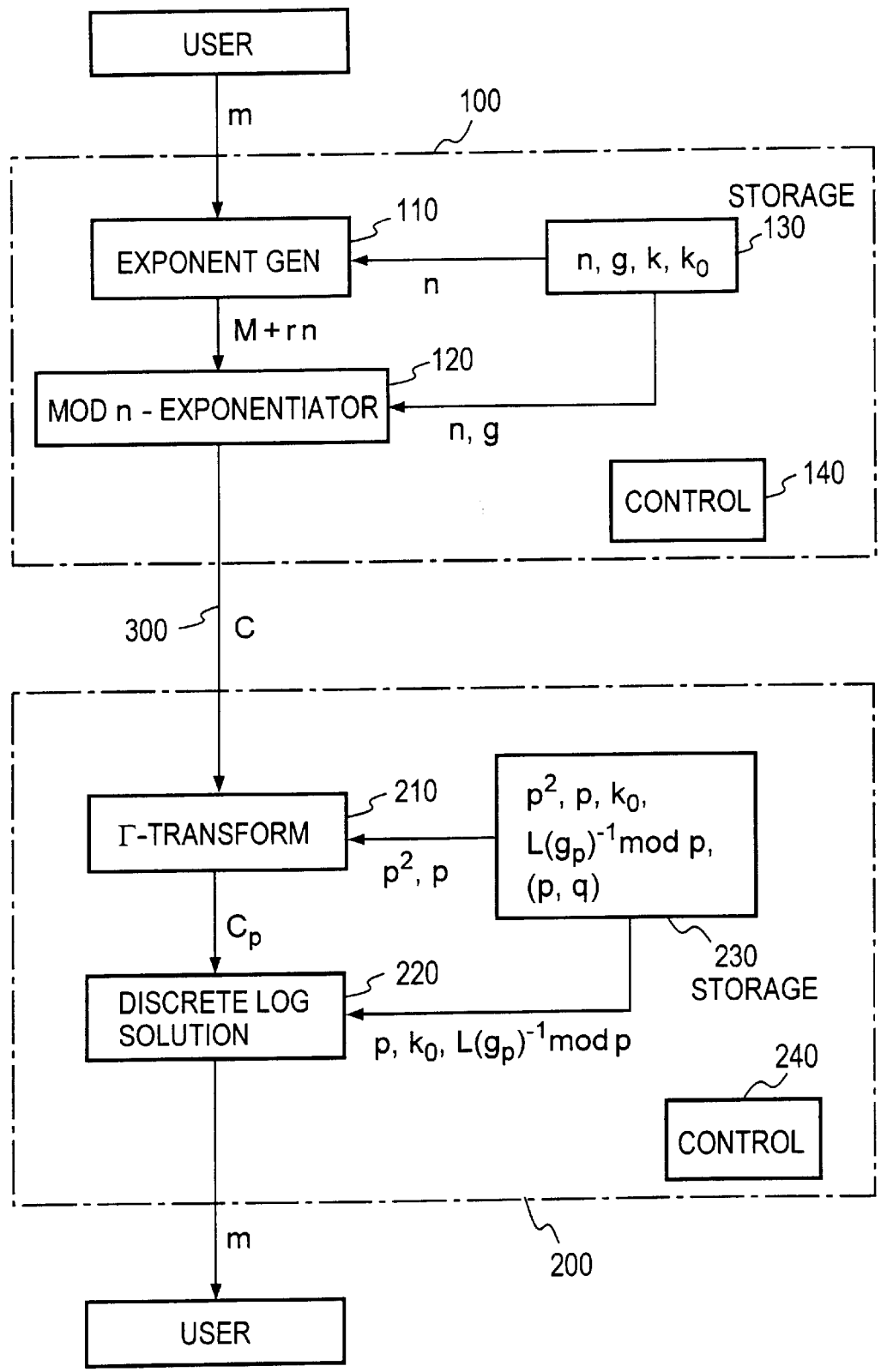
FIG. 3 is a block diagram illustrating the functional configuration of "modification 1 of the public-key cryptosystem based on the multiplicative group" employing other embodiments of the encryption and encryption devices according to the present invention.
Figure 5:
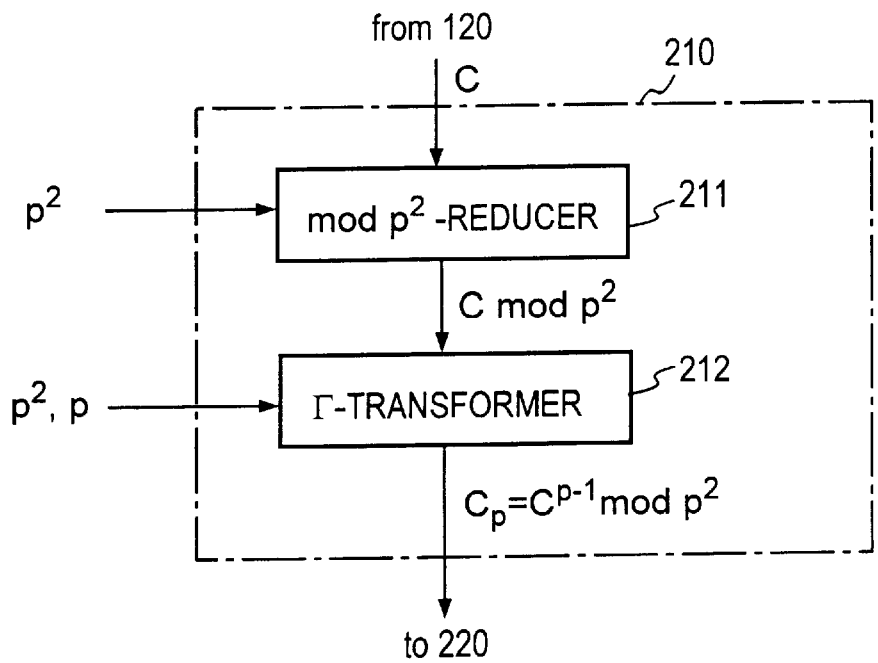
FIG. 5 is a block diagram depicting a concrete example of a Γ-transform part 210 in FIG. 3.
Figure 6:
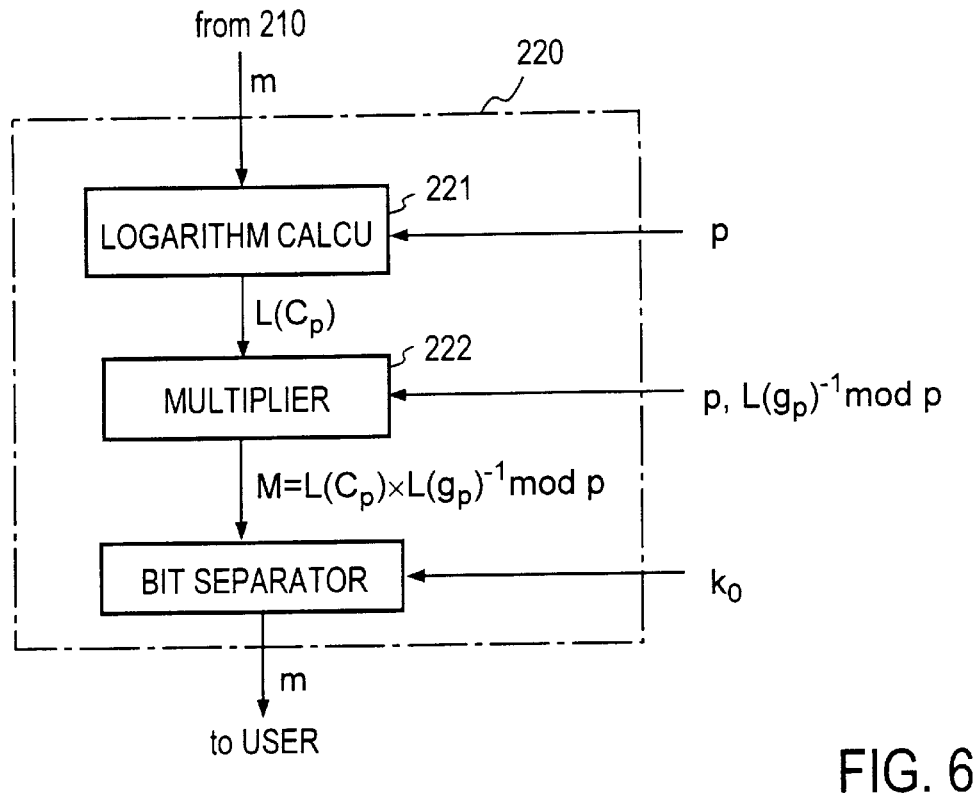
FIG. 6 is a block diagram depicting a concrete example of the functional configuration of a discrete logarithm solution part 220 in FIG. 3.

Since the decryption process of Modified Embodiment 2 is basically identical with that of Modified Embodiment 2, reference is made to FIGS. 3, 5 and 6. By raising either side of the ciphertext C defining equation (32) to the (p−1)th order, the congruence expression with mod n holds with mod $p^2$ as well. The order of $g^p$ mod $p^2$ is p, and rn is a multiple of p; so, $g_p^{Rn}=1$. Hence, $$C^{p-1}=g^{(p-1)(M+Rn)}=g_p^M \times g_p^{Rn} \bmod p^2 = g_p^M \bmod p^2$$

Accordingly, M can similarly be computed by Eqs. (35), (36), (37) and (38), and the plaintext m can be obtained from the high-order $k_0$ bits of M and thus decrypted.

<Concrete Examples>

Figure 4:
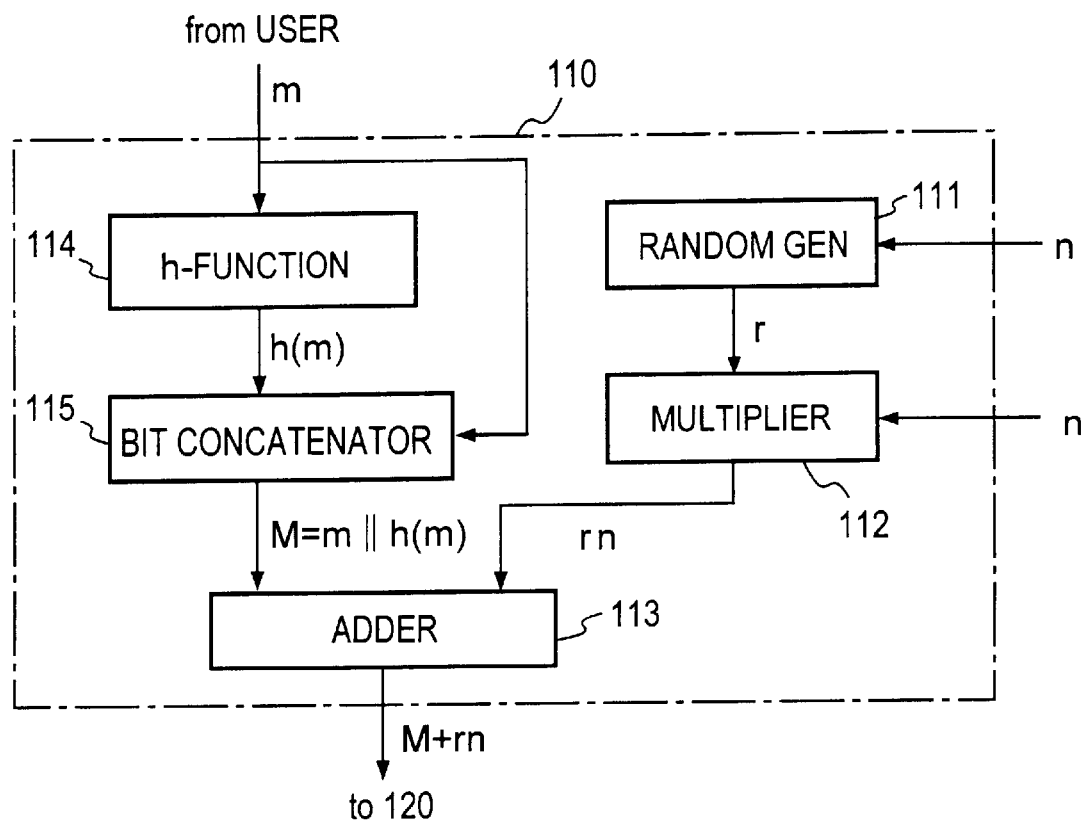
FIG. 4 is a block diagram depicting a concrete example of the functional configuration of an exponent generation part 110 in FIG. 3.

A description will be given, with reference to FIGS. 3 and 4, of Modified Embodiment 1 of the public-key cryptosystem based on the multiplicative group. In FIGS. 3 and 4 the parts corresponding to those in FIGS. 1 and 2 are identified by the same reference numerals. The encryption device 100 and the decryption device 200 are connected via the communication line 300. The encryption device 100 comprises the exponent generation part 110, the modular-n exponentiator 120, the storage part 130, and the control part 140. The decryption device 200 comprises the Γ-transform part 210, the discrete logarithm solution part 220, the storage part 230 and the control part 240.

In FIG. 4 there is depicted a detailed configuration of the exponent generation part 110 in the encryption device 100. Upon receiving the plaintext m from the user of the encryption device 100, the exponent generation part 110 generates a random number r∈Z/nZ by the random generator 111, then reads out the public key n from the storage part 230, and inputs the random number r and the public key n into the multiplier 112 to compute rn. At the same time, an h-function operator 114 inputs thereinto m as a variable and outputs h(m). The output h(m) and the plaintext m are input into a bit concatenator 115, which outputs M=m∥h(m). M and rn are provided to the adder 113 to calculate M+rn, which is input into the modular-n exponentiator 120 in FIG. 3 to generate the ciphertext C=$g^{M+rn}$ mod n. The control part 140 effects sequential control of the respective parts and readout control of the storage part 130.

Next, the decryption process in the decryption device 200 will be described below. In FIG. 5 there is depicted a detailed configuration of the Γ-transform part 210 in the decryption device 200. In FIG. 6 there is depicted a detailed configuration of the discrete logarithm solution part 220. In FIGS. 5 and 6 the parts corresponding to those in FIGS. 2B and C are identified by the same reference numerals as those in the latter. In the storage part 230 in FIG. 3 there are prestored $p^2$, p and $L(g_p)^{-1}$ mod p precalculated from the secret key p and the public key g. Upon receiving the ciphertext C from the communication line 300, the Γ-transform part 210 in the decryption device 200 reads out $p^2$ and p from the storage part 230, and inputs $p^2$ and the ciphertext C into the mod $p^2$-reducer 211 to calculate C mod $p^2$, which is input into a Γ-transformer 212. The Γ-transformer 212 calculates $C_p = C^{p-1}$ mod $p^2$, and provides the calculation result $C_p$ to the discrete logarithm solution part 220.

The discrete logarithm solution part 220 provides the value $C_p$ from the Γ-transform part 210 to the logarithm calculator 221, which calculates $L(C_p)$. The value $L(C_p)$ and $L(g_p)$−1 mod p read out of the storage part 230 are input into the multiplier 222, which calculates $M=L(C_p) \times L(g_p)^{-1}$ mod p. The value M and $k_0$ read out of the storage part 230 are provided to a bit separator 223 to extract the high-order $k_0$ bits of the value M, and this value is output as the decrypted plaintext m from the discrete logarithm solution part 220. The sequential control of the respective parts and the readout control of the storage part 230 are effected by the control part 240. It is also possible to store only p and g in the storage part 230 and obtain $p^2$ and $L(g_p)^{-1}$ mod p through calculation.

Figure 7:
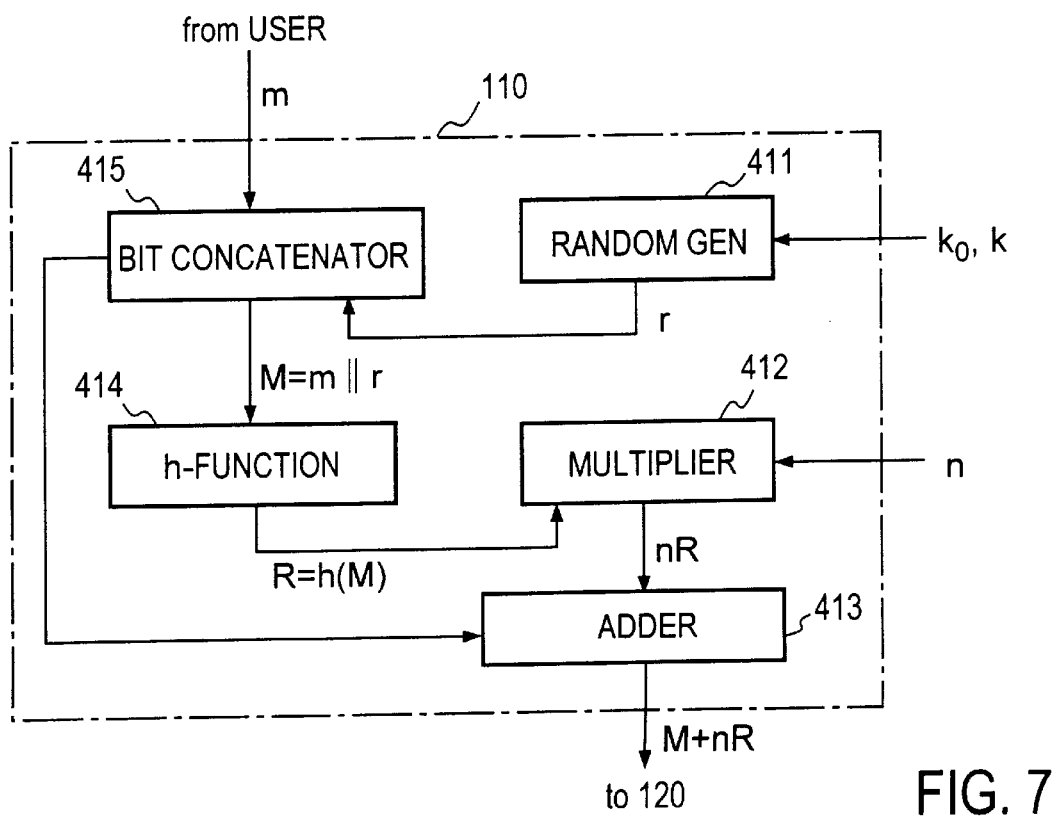
FIG. 7 is a block diagram depicting a concrete example of an exponent generation part in a modification 2 of the encryption device according to the present invention.

Next, a description will be given of Modified Embodiment 2 of the public-key cryptosystem in the multiplicative group. The basic configuration of this embodiment is identical with the FIG. 3 embodiment except that the exponent generation part 110 has such a configuration as depicted in FIG. 7. Upon receiving the plaintext m from the user of the encryption device 100, the exponent generation part 110 generates a random number r (whose number of bits is $k-k_0-1$) by a random generator 411, then inputs the random number r and n into a bit concatenator 415 to obtain M=m∥r, and inputs it into an h-function operator 414 to obtain R=h(m). The output R and n are fed into a multiplier 412 to obtain Rn. The outputs Rn and M are provided to an adder 413 to obtain M+Rn. This addition result is fed into the modular-n exponentiator 120 to generate the ciphertext C=$g^{M+Rn}$ mod n.

The decryption procedure by the decryption device in this case is the same as in the case of the decryption device 200 of Modified Embodiment 1.

In Modified Embodiments 1 and 2 depicted in FIGS. 3 to 6, too, the encryption and decryption procedures may be stored as computer programs on a recording medium and read out therefrom for execution as required.

SECOND EMBODIMENT

The first embodiment has been described to construct the public-key cryptosystem on the modular-n reduced residue class group $(Z/nZ)^*$ where $n=p^2q$. A public-key cryptosystem, which is constructed on an elliptic curve $E_n$ defined over a modular-n ring Z/nZ where n=pq, will hereinafter be referred to as a public-key cryptosystem based on an elliptic curve, which will be described below. In this instance, too, determine two primes p and q such that n=pq, and assume that elliptic curves $E_p$ and $E_q$ over $F_p$ and $F_q$ are given as follows:

$$E_p: y^2 = x^3 + a_p x + b_p \tag{39}$$

where $a_p, b_p \in F_p$ and $4a_p^3 + 27b_p^2 \neq 0$ $$E_q: y^2 = x^3 + a_q x + b_q \tag{40}$$

where $a_q, b_q \in F_q$ and $4a_q^3 + 27b_q^2 \neq 0$

By the Chinese remainder theorem, a and b such that $a \equiv a_p$ mod p, $b \equiv b_p$ mod p, $a \equiv a_q$ mod q and $b \equiv b_q$ mod q are determined uniquely with mod n, and an elliptic curve defined over Z/nZ is obtained as follows:

$$E_n: y^2 = x^3 + ax + b \tag{41}$$

where a, b∈Z/nZ and $GCD(4a^3+27b^2, n)=1$

In the following description, unless otherwise specified, elliptic curves which are obtained by the Chinese remainder theorem as described above will be expressed by such an equation as follows:

$$E_n = [E_p, E_q], \ a=[a_p, a_q], \ b=[b_p, b_q] \tag{42}$$

When it is particularly desirable to emphasize moduli, such elliptic curves will also be expressed as follows:

$$E_n = [E_p \bmod p, E_q \bmod q] \tag{43}$$

An elliptic curve over the finite field $F_p$, which has order p, will hereinafter referred to as an anomalous elliptic curve. It is described in Jounal Takakazu Satoh et al., "Fermat Quotients and the Polynomial Time Discrete Log Algorithm for Anomalous Elliptic Curves," COMMENTARII MATHEMATICI UNIVERSITATIS SANCTI PAULI, Vol 47, No. 1 1998 (hereinafter referred to as Literature 11) that the discrete logarithm problem on the anomalous elliptic curve can be computed with high efficiency. An algorithm for solving the discrete logarithm problem on the anomalous elliptic curve will hereinafter be referred to as an SSA algorithm.

Now, let $E_p$ be anomalous elliptic curve and $E_q$ a non-anomalous elliptic curve. As is the case with the above-described "public-key cryptosystem based on the multiplicative group," n, $E_n$, the point G on $E_n(Z/nZ)$ and k are published as a public key. In this instance, however, the point G is set at a value of sufficiently higher order (for example, equal to n in the number of bits), and k represents the numbers of bits of the primes p and q. Letting the plaintext be selected in the range of $0<m<2^{k-1}$, r is arbitrarily selected from Z/nZ, and the encryption is defined by the following equation:

$$C=(m+rn)G \in E_n(Z/nZ) \tag{44}$$

As regards the decryption, since a person who knows the prime factor p of n can transform the defining equation of this ciphertext into a modular n relationship between points on $E_p(F_p)$, he can efficiently compute the discrete logarithm on the elliptic curve through the use of the afore-mentioned SSA algorithm. Hence, he can efficiently decrypt the ciphertext. Further, it can be proved that the analysis of this public-key cryptosystem is equivalent to factoring of n when the elliptic curve $E_n$ over Z/nZ, obtained by the Chinese remainder theorem from the public key n and the anomalous and non-anomalous elliptic curves, and the point G are given. That is, letting the problem of factoring n for the point G on the elliptic curve $E_p$ be called a modified factoring problem (hereinafter referred to as MIFP), it is possible to prove that the analysis of the cryptography using the elliptic curve $E_n$ is equivalent to MIFP.

In the "public-key cryptosystem based on elliptic curves" according to the second embodiment, the encryption device comprises an exponent generation part which combines a plaintext and a random number into an exponent part for an exponentiation in $E_n(z/nZ)$, and an $E_n$-exponentiator which performs an exponentiation in $E_n(z/nZ)$, and the ciphertext generated by the $E_n$-exponentiator is sent over a communication line. On the other hand, the decryption device comprises a mod p-reducer which transforms a point on $E_n(Z/nZ)$ to a point on $E_p(F_p)$, and an SSA algorithm part which solves the discrete logarithm problem on $E_p(F_p)$ for decryption of the ciphertext.

Next, a description will be given of the method of construction of cryptography of the "public-key cryptosystem based on elliptic curves" and the equivalence of its analysis to the modified factoring problem.

The SSA algorithm will be described first which is used for decryption.

The discrete logarithm problem on the anomalous elliptic curve over the finite field $F_p$ is to find $m \in Z/pZ$ which satisfies P=mG for an $F_p$-rational points G and P. As referred to above, the SSA algorithm provides a solution to the discrete logarithm problem on the anomalous elliptic curve, and is efficient in that the computation amount for the anomalous elliptic curve over the finite field $F_p$ is on the order of $k^3$ where k is the number of bits of the prime p. The procedure of this algorithm is such as listed below.

<SSA Algorithm>

Step 1: Choose an elliptic curve E' which is produced by lifting E to Z and such that a homomorphism $\lambda_E$ from the elliptic curve $E(F_p)$ to the finite field $F_p$ does not become non-trivial. This can be computed on the order of $k^2$ where k is the number of bits of the prime p.

Step 2: Compute $\lambda_E'(G)$ and $\lambda_E'(P)$ through the use of the homomorphism $\lambda_E'$ constructed in step 1 (which can be done on the order of $k^3$) and compute $m=\lambda_E'(P)/\lambda_E'(G)$ mod p (which can be done on the order of $k^3$).

At any rate, the computational complexity of the SSA algorithm is on the order of $k^3$ where k is the number of bits of the prime p. This homomorphism $\lambda_E'$ provides an isomorphism as a group from the elliptic curve $E(F_p)$ to the finite field $F_p$. For details about the $\lambda_E'$ constructing method and so on, see Literature 10. When p is equal to or smaller than 5, this discrete logarithm problem can efficiently be solved without using the SSA algorithm.

<Key Generation>

Choose odd primes p and q arbitrarily and set n=pq. In this case, assume that the primes p and q have the same number of bits, which is represented by k. Next, choose an anomalous elliptic curve $E_p$ over $F_p$ and a non-anomalous elliptic curve $E_q$ over $F_q$.

$$E_p:y^2=x^3+a_px+b_p \tag{45}$$

where $a_q$, $b_p \in F_p$, $4a_p^3+27b_p^2 \neq 0$ $$E_q:y^2=x^3+a_qx+b_q \tag{46}$$

where $a_q$, $b_p \in F_q$, $4a_q^3+27b_q^2 \neq 0$
Here, $\#E_p(F_p)=p$, $$\#E_q(F_q)=q'=q+1-t$$

which are assumed to satisfy $-2q^{1/2} \leq t \leq 2q^{1/2}$ and $t \neq 1$, $q' \neq p$. The symbol # represents the number of elements of a set. As a method for constructing an elliptic curve with an expected order there is proposed a relatively efficient method which utilizes a complex multiplication theory; in particular, the generation of the anomalous elliptic curve is described, for example, in Miyaji, A., "Elliptic Curve Suitable for Cryptography," IEICE Trans. Fundamentals, E76-A, 1, pp. 50–54 (1993) (hereinafter referred to as Literature 13). Assume that point $G_p$ and $G_q$ on the elliptic curves $E_p(F_p)$ and $E_q(F_q)$ are chosen which have orders ord($G_p$)=p and ord($G_q$)=q'. Although the elliptic curve $E_q(F_q)$ does not usually form a cyclic group, it is assumed so here for the sake of brevity. In general, it is possible to choose such that q' has a sufficiently large prime and select, as $G_q$, the point where the order is the large prime. This is followed by constructing the elliptic curve $E_n$ on Z/nZ through the use of the Chinese remainder theorem.

$$E_n:y^2=x^3+ax+b, \ a,b \in Z/nZ, \ GCD(4a^3+27b^2, n)=1 \tag{47}$$

That is, if already defined symbols are used, $$E_n=[E_p, E_q], \ a=\{a_p, a_q\}, \ b=[b_p, b_q] \tag{48}$$

Further, set $$G=[G_p, G_q] \tag{49}$$

Moreover, $\lambda_{EP}'(G_p)^{-1}$ mod p is precalculated as one of system parameters by the SSA algorithm. This value is not published and may be considered as one of secret keys. For simplicity, this isomorphism will hereinafter be identified by $\lambda$.

Accordingly, let (n, $E_n$, G, k) be a public key and (p, q) a secret key. In this instance, $E_p$, $E_q$, $G_p$, $G_q$ and $\lambda(G_p)^{-1}$ mod p may also be secret keys.

<Encryption Process>

For the plaintext m (where $0 \leq m < 2^{k-1}$), the random number r is selected from the range of $0 \leq r < n$, then m+rn is computed, and the ciphertext C is computed as follows:

$$C=(m+rn)G \in E_n(Z/nZ) \tag{50}$$

It must be noted, however, that this is the result of multiplication of the point G by m+rn through the use of an addition on the elliptic curve $E_n$, and that the ciphertext is a point on the elliptic curve. That is, this a set of elements of two Z/nZ. The ciphertext could be written such that $C=(C_x, C_y)$, $C_x$, $C_y \in Z/nZ$.

<Decryption Process>

By performing a modular-n calculation of either side of the ciphertext C defining equation (50), the solution of Eq. (50) is converted to the discrete logarithm problem on the anomalous elliptic curve as follows:

$$C_p=(m+rn)G_p=mG_p \in E_p(F_p) \quad (51)$$

because rn is a multiple of the prime p and rnG mod p=0, where $C=[C_p, C_q]$.

Hence, the plaintext m can be obtained using the SSA algorithm. Actually, due to the homomorphic property of λ, $$\lambda(C_p)=\lambda(mG_p)=m\lambda(G_p) \bmod p \quad (52)$$

that is, $$m=\lambda(C_p)/\lambda(G_p) \bmod p \quad (53)$$

Thus, the plaintext can be decrypted.

With the above decryption procedure, the ciphertext C is decrypted by first calculating $C=C_p$ mod p, then calculating $\lambda(C_p)$, and finally performing a modular-p multiplication of $\lambda(C_p)$ and precalculatable $\lambda(G_p)^{-1}$ mod p.

<Proof of Security>

By proving that the analysis of the "public-key cryptosystem based on elliptic curves" is equivalent to factoring of n based on information such as the public keys (n, $E_n$, G, k), it is proved that the public-key cryptosystem based on elliptic curves is secure against passive adversaries.

If there is available an algorithm which factors n with non-negligible probability, a probabilistic polynomial time algorithm which analyzes the "public-key cryptosystem based on elliptic curves" can apparently be constructed. Accordingly, only the following fact will be proved.

"If an algorithm B is available which analyzes the 'public-key cryptosystem based on elliptic curves' with non-negligible probability, it is possible to construct a probabilistic polynomial time algorithm for factoring n"

What is intended to mean by the "algorithm for facotring n with non-negligible probability" is an algorithm which ensures factoring of n by repeatedly applying the algorithm on the order of a polynomial using the number of bits of the input n as a variable. The same holds true in the following description (see Literature 12 for its strict definition).

Actually, it is possible to prove that the difference between the distribution of z mod LCM(p−1, q−1), where n is a composite number (=pq) and z is randomly selected from Z/nZ, and the distribution of m+rn mod pq' for m+rn, which appears in the encryption procedure of the public-key cryptosystem according to the present invention is negligible. For this reason, the algorithm B recognizes that C calculated by $C=zG \in E_n(Z/nZ)$, where z is randomly selected from Z/nZ, is a ciphertext with non-negligible probability, and the algorithm B outputs a plaintext $z_0$ corresponding to C. Now, since the probability that z is a number in the range of $z<2^{k-1}$ is negligible, it may be set such that $z \geq 2^{k-1}$ with non-negligible probability. In this case, $z \equiv z_0 \pmod{p}$ does not hold, and $z \equiv z_0 \pmod{n}$ does not hold because of $z_0 < 2^{k-1}$. Accordingly, the calculated value of $GCD(z-z_0, n)$ becomes p, permitting factoring of n. Thus, it is possible to factor n in a time on the order of probabilistic polynomial using its bit number as a variable.

<Concrete Examples>

Next, a description will be given of an embodiment of the "public-key cryptosystem based on elliptic curves."

Figure 8:
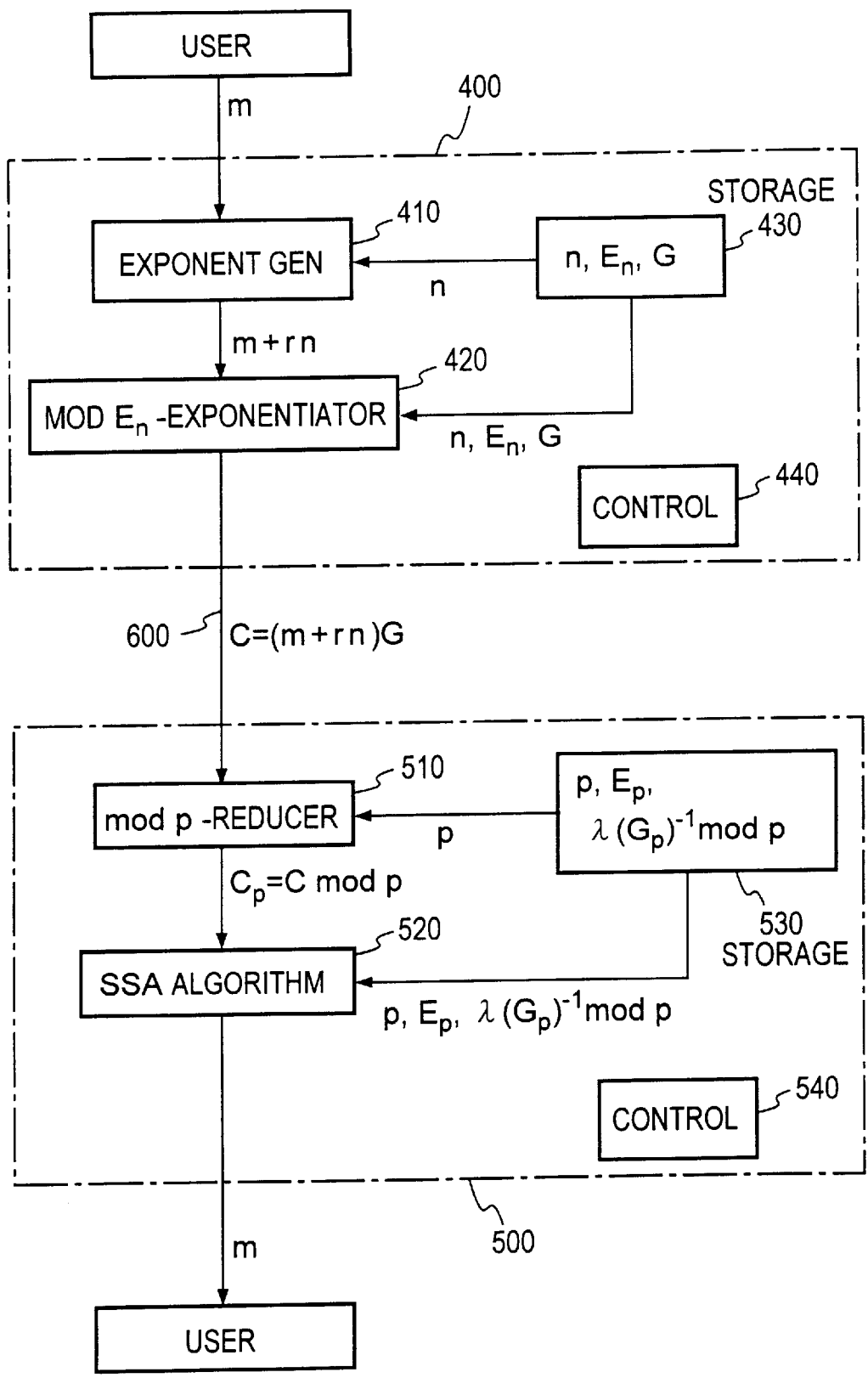
FIG. 8 is a block diagram illustrating the functional configuration of each of embodiments of encryption and decryption devices in a "public-key cryptosystem based on elliptic curves" according to the present invention.

In FIG. 8 there is illustrated in block form the cryptosystem according to the second embodiment of the invention. An encryption device 400 and a decryption device 500 are connected via a communication line 600. The encryption device 400 has an exponent generation part 410 and $E_n$-exponentiator 420. The decryption device 500 has a mod p-reducer 510 and an SSA algorithm part 520.

Figure 9A:
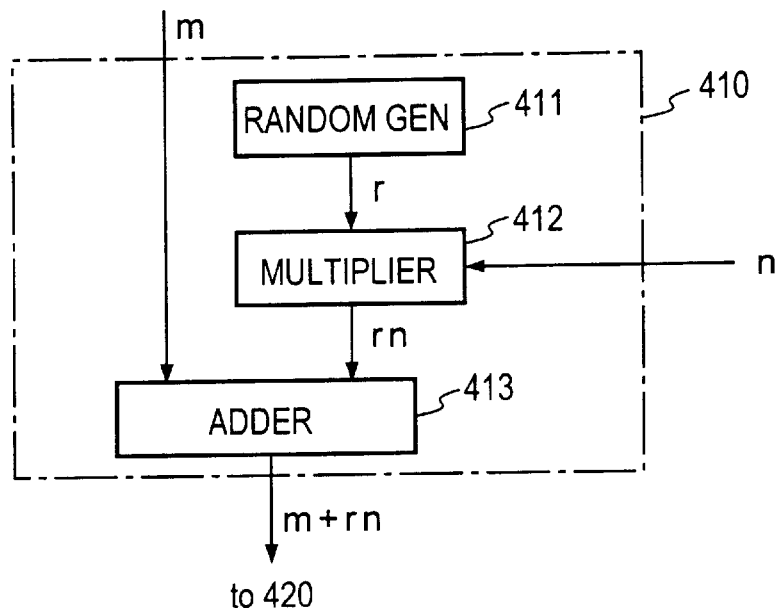
FIG. 9A is a block diagram depicting a concrete example of the functional configuration of an exponent generation part 410 in FIG. 8.

In the first place, the encryption process in the encryption device 400 will be described below. A detailed configuration of the exponent generation part 410 in the encryption device 400 is depicted in FIG. 9A. Upon receiving a plaintext (m) from a user of the encryption device 400, the exponent generation part 410 generates a random number r∈Z/nZ by a random generator 411, and inputs the random number r into a multiplier 412. The multiplier 412 calculates rn and provides it to an adder 413 to calculate m+rn, which is fed into the $E_n$-exponentiator 420 to generate a ciphertext C=(m+rn)G.

Figure 9B:
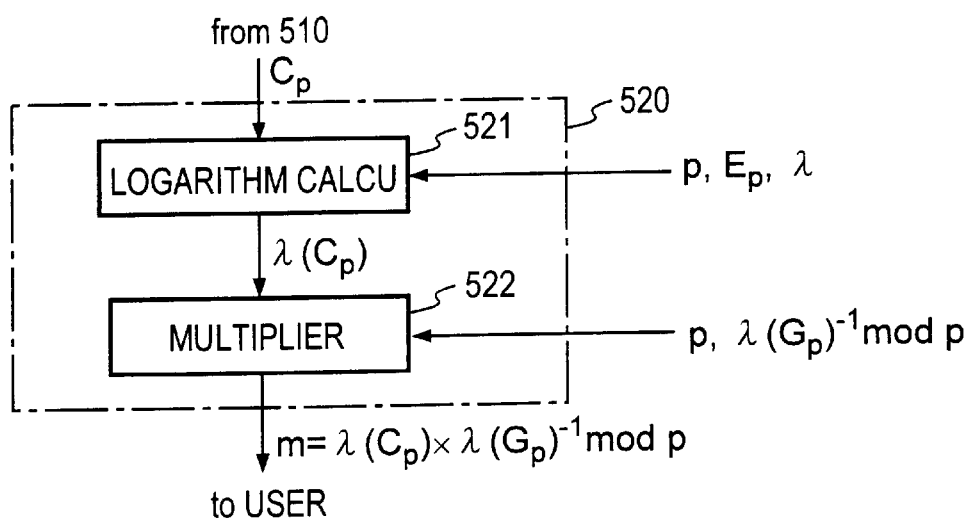
FIG. 9B is a block diagram depicting a concrete example of the functional configuration of an SSA algorithm part 520 in FIG. 8.

Next, the decryption process in the decryption device 500 will be described below. A detailed configuration of the SSA algorithm part 520 in the decryption device 500 is depicted in FIG. 9B. Upon receiving the ciphertext (C) from the communication line 600, the mod p-reducer 510 in the decryption device 500 calculates $C_p=C$ mod p∈$E_p(F_p)$, and inputs $C_p$ into the SSA algorithm part 520. As depicted in FIG. 9B, upon receiving $C_p$ from the mod p-reducer 510, the SSA algorithm part 520 provides it to a logarithm calculator 521 to calculate $\lambda(C_p)$ using the isomorphism λ and the prime p, and inputs the calculation result into a multiplier 522, which calculates $\lambda(C_p) \times \lambda(G_p)^{-1}$ mod p using precalculated $\lambda(G_p)^{-1}$ mod p. The SSA part 520 outputs the thus obtained value as a decrypted plaintext m.

The encryption and decryption procedures by the encryption device of the second embodiment, shown in FIGS. 8, 9A and 9B, may be implemented by recording the procedures as programs on a recording medium and reading it out for execution by a computer.

Figures 10, 11:
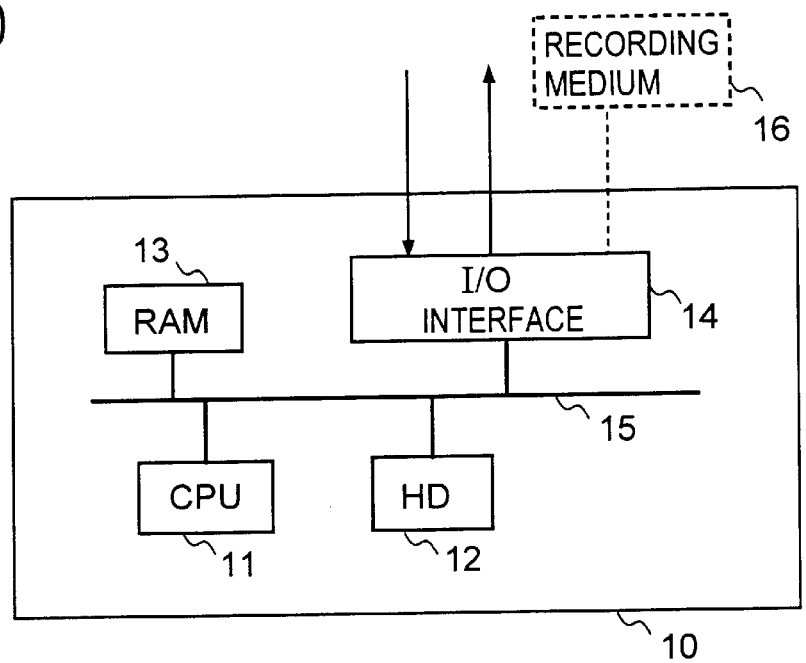
FIG. 10 is a block diagram illustrating the configuration for performing encryption and decryption through execution of operation programs stored on a recording medium.
FIG. 11 is a table which gives a comparison in performance between conventional public-key cryptosystems and the public-key cryptosytem of the present invention.

As described previously, the encryption and decryption procedures by the encryption and decryption devices of the above-described first and second embodiments may be stored on a recording medium as compute r-executable programs on a recording medium so that they are read out for execution as desired. In such an instance, the encryption and decryption devices are implemented, for example, as an ordinary computer 10 composed of a control unit (CPU) 11, a hard disk 12, a RAM 13 and I/O interface 14 interconnected via a bus 15 as shown in FIG. 10. The encryption program and the decryption program are prestored, for example, on the hard disk 12 used as a recording medium, and the CPU 11 uses the RAM 13 as a work area for processing and performs the aforementioned various operations following the programs. In the case of the encryption device, the plaintext m to be encrypted is input thereinto via the I/O interface 14 from the user and the ciphertext C is output via the I/O interface 14. In the case of the decryption device, the ciphertext C is input thereinto via the I/O interface 14 and the decrypted plaintext m is output. The recording medium for storing such encryption and decryption programs may be an external recording medium 16 connected to the computer 10 as indicated by the broken lines in FIG. 10.

EFFECT OF THE INVENTION

The table of FIG. 11 give a comparison of the cryptosystem of the first embodiment of the present invention and typical common-key cryptosystems considered practical at present, RSA, Rabin and ElGamal schemes, in terms of the computational complexities involved in encryption and decryption and security. The computation amounts are estimated using, as one unit, a modular multiplication with a natural number of 1024 bits. The parameter used in RSA is $e=2^{16}+1$ and the random number used in ElGamal is about 130-bit. As for security, the double circle indicates that equivalence to the basic problem (the factoring problem or discrete logarithm problem) is provable; the white circle "O" indicates that equivalence to a problem (the afore-mentioned p subgroup problem, for instance), which is a little easier than the basic problems, is provable; the cross "x" indicates that equivalence to the basic problems is not provable; and the question mark "?" Indicates that equivalence to the basic problems has not been proved.

From the table of FIG. 11 it is evident that the public-key cryptosystem according to the present invention is a practical cryptosystem which has the same processing speed as that of the conventional public-key cryptosystems and achieves a high level of security.

As described above, according to the present invention, a novel public-key cryptosystem which is provably secure against passive adversaries and chosen ciphertext attacks can be constructed based on the assumption of intractability of the facotring problem. At present, it is said that the cryptosystem is sufficiently secure with a minimum number of about 1024 bits for n; that is, p and q need only to have 340 bits. For example, in this case, if the plaintext m is 250-bit, it is practical to increase it by 80 bits to obtain M of 330 bits. Furthermore, the computation amounts for both of the encryption and decryption are on the order of $k^3$, where k is the number of bits of the public key n. These computation amounts are about the same as those of the conventional typical public-key cryptosystems; hence, the public-key cryptosystem of the present invention is very practical. Besides, since the cryptosystem of the present invention can be said to be secure against passive adversaries and chosen ciphertext attacks based on the assumption that the factoring problem is intractable, it is assured that the cryptosystem of the present invention is more secure than the RSA cryptosystem regarded as the most powerful at present.

What is claimed is:

1. An encryption device for a public-key cryptosystem comprising:

exponent generating means for generating an exponent by combining an input plaintext m and a random number r; and exponentiating means for generating a ciphertext by exponentiating a second public key g with said exponent in a modular-n reduced residue class group, where said n is a first public key which is a composite number defined by $n=p^2q$ where p and q are odd primes having the same number k of bits.

2. The encryption device of claim 1, wherein said second public key g is selected from a modular-n reduced residue class group $(Z/nZ)^*$ such that $g_p=g^{p-1}$ mod $p^2$ has an order of p in $(Z/p^2Z)^*$.

3. The encryption device of claim 1 or 2, wherein said exponent generating means comprises a multiplier for multiplying said random number r and said first public key n and for outputting the multiplication result rn, and an adder for adding said multiplication result rn and said plaintext m and for outputting the addition result m+rn as said exponent.

4. The encryption device of claim 1, wherein said exponent generating means comprises:

h-function operating means for transforming said plaintext m to h(m) through calculation with a hash function;

bit concatenating means for concatenating said h(m) and said plaintext m to obtain a value M=m∥h(m);

random generating means for generating said random number r;

multiplying means for multiplying said random number r and said first public key n; and adding means for adding the multiplication result rn and said plaintext m to provide the addition result as the output from said exponent generating means.

5. The encryption device of claim 4, wherein said second public key g is selected from a modular-n reduced residue class group $(Z/nZ)^*$ such that $g_p=g^{p-1}$ mod $p^2$ has an order of p in $(Z/p^2Z)^*$, the number of bits of said h(m) is $k-k_0-1$ where $0<k_0<k$, and the number of bits of said plaintext m is $k_0$.

6. The encryption device of claim 1, wherein said exponent generating means comprises:

random generating means for generating said random number r;

bit concatenating means for concatenating said plaintext m and said random number to obtain a value M=m∥r;

h-function operating means for transforming said value M to R=h(M) through calculation with a hash function;

multiplying means for multiplying said R and said first public key n; and adding means for adding the multiplication result Rn and said M to provide the addition result as the output from said exponent generating means.

7. The encryption device of claim 6, wherein said second public key g is selected from a modular-n reduced residue class group $(Z/nZ)^*$ such that $g_p=g^{p-1}$ mod $p^2$ has an order of p in $(Z/p^2Z)^*$, the number of bits of said random number r is $k-k_0-1$ where $0<k_0<k$, and the number of bits of said plaintext m is $k_0$.

8. A decryption device for a public-key cryptosystem comprising:

Γ-transform means for transforming, through the use of a first secret key, an input ciphertext C to an element $C_p$ of a modular-n reduced residue class group, where said n is a first public key which is a composite number defined by $n=p^2q$ wherein p and q are odd primes; and discrete logarithm solution means for solving a discrete logarithm in said transformed element $C_p$ through the use of a second secret key.

9. The decryption device of claim 8, wherein let said input ciphertext C be an integer in the range of 0<C<n and prime to said n, said p be said first secret key and said n be said first public key, and wherein said Γ-transform means comprises:

$p^2$-reducing means for calculating C mod $p^2\epsilon(Z/p^2Z)^*$; and transform means for performing a modular-$p^2$ exponentiation with p-1 on the calculation result C mod $p^2$ to obtain said element $C_p$.

10. The decryption device of claim 8 or 9, wherein let $g_p$ and said $C_p$ be integers in the ranges of $0<g_p$ and $C_p<p^2$ and satisfying $g_p\equiv C_p\equiv 1$ (mod p) and $g_p\neq 1$ (mod $p^2$), and $[(g_p-1)/p]^{-1}$ mod p be said second secret key, and wherein said discrete logarithm solution means comprises:

logarithm calculating means supplied with said element $C_p$, for calculating $L(C_p)=(C_p-1)/p$; and multiplying means for performing a modular multiplication of the calculation result $L(C_p)$ and said second secret key $[(g_p-1)/p]^{-1}$ mod p with said p and for outputting a decrypted plaintext.

11. The decryption device of claim 8, which, letting k be the number of bits of said odd prime p where $0<k_0<k$, further comprises means for outputting, as a decrypted plaintext, high-order $k_0$ bits of the solution of said discrete logarithm solution means.

12. The decryption device of claim 11, wherein let said input ciphertext C be an integer in the range of 0<C<n and prime to said n, said p be said first secret key and said n be said first public key, and wherein said Γ-transform means comprises:

$p^2$ reducing means for calculating C mod $p^2 \in (Z/p^2Z)^*$; and transform means for performing a modular-$p^2$ exponentiation of the calculation result C mod $p^2$ with p−1 to obtain said element $C_p$.

13. The decryption device of claim 12, wherein let $g_p$ and said $C_p$ be integers in the ranges of $0<g_p$ and $C_p<p^2$ and satisfying $g_p \equiv C_p \equiv 1$ (mod p) and $g_p \neq 1$ (mod $p^2$), and $[(g_p-1)/p]^{-1}$ mod p be said second secret key, and wherein said discrete logarithm solution means comprises:

logarithm calculating means supplied with said element $C_p$, for calculating $L(C_p)=(C_p-1)/p$; and multiplying means for performing a modular multiplication of the calculation result $L(C_p)$ and said second secret key $[(g-1)/p]^{-1}$ mod p with said p and for outputting a decrypted plaintext.

14. A recording medium on which there is recorded a program for executing an encryption process of an encryption device through the use of first and second public keys n and g, wherein said program comprises:

an exponent generating step of generating an exponent by combining an input plaintext m and a random number r; and an exponentiating step of generating a ciphertext C by exponentiating said second public key g with said exponent in a modular-n reduced residue class group, where said n is said first public key which is a composite number defined by $n=p^2q$ where p and q are odd primes.

15. The recording medium of claim 14, wherein said exponent generating step of said program comprises the steps of:

generating said random number r;

multiplying said random number r and said first public key n; and adding the multiplication result rn and said plaintext m and outputting the addition result m+rn as said exponent; and wherein said ciphertext C generating step is a step of generating said ciphertext C by performing a modular-n exponentiation of said public key g with said addition result m+rn, where said n is said first public key.

16. The recording medium of claim 14 or 15, wherein p and q have the same number of bits, and said second public key g is selected from a modular-n reduced residue class group $(Z/nZ)^*$ such that $g_p=g^{p-1}$ mod $p^2$ has an order of p in $(Z/p^2Z)^*$.

17. The recording medium of claim 14, wherein said exponent generating step comprises the steps of:

generating said random number r;

multiplying said random number r and said first public key n;

transforming said plaintext m to h(m) through calculation with a hash function;

bit concatenating said h(m) and said plaintext m to obtain value M=m∥h(m); and adding the multiplication result rn and said value M and outputting the addition result M+rn as said exponent; and wherein said ciphertext C generating step is a step of generating said ciphertext C by performing a modular-n exponentiation of said public key g with said addition result M+rn, where said n is said first public key.

18. The recording medium of claim 17, wherein said p and q have the same number k of bits, said second public key g is selected from a modular-n reduced residue class group $(Z/nZ)^*$ such that $g_p=g^{p-1}$ mod $p^2$ has an order of p in $(Z/p^2Z)^*$, the number of bits of said h(m) is $k-k_0-1$ where $0<k_0<k$, and the number of bits of said plaintext m is $k_0$.

19. The recording medium of claim 14, wherein said exponent generating step of said program comprises the steps of:

generating said random number r;

bit concatenating said random number r and said first public key n to obtain a value M=n∥r;

transforming said value M to R=h(M) through calculation with a hash function h;

multiplying said value R and said first public key n; and adding the multiplication result nR and said value M and outputting the addition result M+nR as said exponent; and wherein said ciphertext C generating step is a step of generating said ciphertext C by performing a modular-n exponentiation of said public key g with said addition result M+nR, where said n is said first public key.

20. The recording medium of claim 19, wherein said p and q have the same number k of bits, said second public key g is selected from a modular-n reduced residue class group $(Z/nZ)^*$ such that $g_p=g^{p-1}$ mod $p^2$ has an order of p in $(Z/p^2Z)^*$, the number of bits of said random number r is $k-k_0-1$ where $0<k_0<k$, and the number of bits of said plaintext m is $k_0$.

21. A recording medium on which is recorded a program for executing a decryption process of a decryption device through the use of first and second public keys n and g, wherein said program comprises:

a Γ-transforming step of transforming, through the use of a first secret key, an input ciphertext C to an element $C_p$ of a modular-n reduced residue class group, where said n is said first public key which is a composite number defined by $n=p^2q$ where p and q are odd primes; and a discrete logarithm solving step of solving a discrete logarithm in said transformed element $C_p$ through the use of a second secret key.

22. The recording medium of claim 21 on which is recorded a program for executing a decryption process, wherein let said input ciphertext C be an integer in the range of 0<C<n and prime to said n, and wherein said Γ-transforming step in said program comprises the steeps of:

calculating an element of a modular-$p^2$ reduced residue class group, C mod $p^2$, for said input ciphertext C; and performing a modular-$p^2$ exponentiation of the calculation result C mod $p^2$ with p−1 to obtain said element $C_p$.

23. The recording medium of claim 21 or 22 on which is recorded a program for executing a decryption process, wherein let $g_p$ and said $C_p$ be integers in the ranges of $0<g_p$ and $C_p<p^2$ and satisfying $g_p \equiv C_p \equiv 1$ (mod q) and $g_p \neq 1$ (mod $p^2$), and said second secret key be $[(g_p-1)/p]^{-1}$ mod p, and wherein said discrete logarithm solving step in said program comprises the steps of:

calculating $(C_p-1)/p$ through the use of said C and said p; and performing a modular-p multiplication of the calculation result $(C_p-1)/p$ by said second secret key to obtain a decrypted plaintext.

24. The recording medium of claim 21 on which is recorded a program for executing a decryption process, wherein, letting k be the number of bits of said odd prime p and $0<k_0<k$, said program further comprises a step of outputting, as a decrypted plaintext, high-order $k_0$ bits of the solution obtained by said discrete logarithm solving step.

25. The recording medium of claim 24 on which is recorded a program for executing a decryption process, wherein let said input ciphertext C be an integer in the range of $0<C<n$ and prime to said n, said p be said first secret key and said n be said first public key, and wherein said Γ-transform step in said program comprises:

$p^2$-reducing step for calculating C mod $p^2 \epsilon (Z/p^2Z)^*$; and transform step for performing a modular-$p^2$ exponentiation of the calculation result C mod $p^2$ with p−1 to obtain said element $C_p$.

26. The recording medium of claim 25 on which is recorded a program for executing a decryption process, wherein let $g_p$ and said $C_p$ be integers in the ranges of $0<g_p$ and $C_p<p^2$ and satisfying $g_p \equiv C_p \equiv 1$ (mod p) and $g_p \neq 1$ (mod $p^2$), and $[(g_p-1)/p]^{-1}$ mod p be said second secret key, and wherein said discrete logarithm solution step comprises:

logarithm calculating step for calculating $L(C_p)=(C_p-1)/p$ for said element $C_p$; and multiplying step for performing a modular multiplication of the calculation result $L(C_p)$ and said second secret key $[(g_p-1)/p]^{-1}$ mod p with said p and for outputting a decrypted plaintext.

27. An encryption device for a public-key cryptosystem comprising:

exponent generating means for generating an exponent by combining an input plaintext and a random number; and exponentiating means for generating a ciphertext by performing a modular exponentiation of a second public key with said exponent in an elliptic curve $E_n$ over a modular-n residue class ring Z/nZ with a first public key n which is a composite number defined by n=pq where p and q are odd primes.

28. A decryption device for a public-key cryptosystem comprising:

reducing means for transforming an input ciphertext to an element $C_p$ of an elliptic curve $E_p$ over a finite field $F_p$ having a number p of $F_p$-rational points which are non-infinite points $G_p$ and $C_p$; and SSA algorithm means for calculating a discrete logarithm for said element $C_p$ and for outputting a decrypted plaintext.

29. The decryption device of claim 28, wherein, letting p be an odd prime larger than 5 and $\lambda(G_p)^{-1}$ mod p be a secret key, said SSA algorithm means comprises:

logarithm calculating means supplied with said element $C_p$, said elliptic curve $E_p$ and said function $\lambda$, for calculating $\lambda(C_p)$; and multiplying means supplied with said $\lambda(C_p)$ and said secret key, for performing a modular multiplication of said $\lambda(C_p)$ and said secret key with said p and for outputting said decrypted plaintext.

30. A recording medium on which there is recorded a program for executing an encryption process of an encryption device which uses an elliptic curve $E_n$ over a modular-n residue ring Z/nZ where said n is obtained by the Chinese remainder theorem from a public key, an elliptic curve $E_p$ over a finite field $F_p$ having a number p of $F_p$-rational points and an elliptic curve $E_q$ over a finite field $F_q$ having a number q of $F_q$-rational points, said program comprising:

a step of generating a random number r;

a step of multiplying said random number r by said public key n;

a step of adding the multiplication result m and an input plaintext m; and a step of generating a ciphertext by performing a modular exponentiation of a second public key with said exponent in an elliptic curve over a modular residue ring Z/nZ with a first public key which is a composite number.

31. A recording medium on which there is recorded a program for executing a decryption process of a decryption device for decrypting an input ciphertext C, wherein let p be an odd prime larger than 5, $E_p$ be an elliptic curve over a finite field $F_p$ and having a number p of $F_p$-rational points, its two $F_p$-rational points be non-infinite points $G_p$ and $C_p$ and $\lambda(G_p)^{-1}$ mod p be a secret key, said program comprising:

a step of performing a modular-p transformation of said input ciphertext C to one element $C_p$ of said elliptic curve $E_p$ over said finite field $F_p$, where p is said odd prime;

a step of obtaining $\lambda(C_p)$ by calculating, for said element $C_p$, an isomorphism function $\lambda$ from $E(F_p)$ to $F_p$; and a step of outputting a decrypted plaintext by performing a modular-p multiplication of said $\lambda(C_p)$ and said secret key, where p is said odd prime.

* * * * *

UNITED STATES PATENT AND TRADEMARK OFFICE
CERTIFICATE OF CORRECTION

PATENT NO. : 6,480,605 B1
DATED : November 12, 2002
INVENTOR(S) : Shigenori Uchiyama et al.

It is certified that error appears in the above-identified patent and that said Letters Patent is hereby corrected as shown below:

<u>Title page,</u>
Item [75], Assignee, should read -- Nippon Telegraph and Telephone Corporation -- not "Telegraph and Telephone Corporation".

Signed and Sealed this

Second Day of December, 2003

JAMES E. ROGAN
*Director of the United States Patent and Trademark Office*